(12) United States Patent
Daimaru et al.

(10) Patent No.: US 8,295,961 B2
(45) Date of Patent: Oct. 23, 2012

(54) SPECTACLE LENS SUPPLY SYSTEM, ORDERING SYSTEM, AND MANUFACTURING METHOD

(75) Inventors: Takashi Daimaru, Tokyo (JP); Yoshihiko Kikuchi, Tokyo (JP); Naoto Katsuki, Tokyo (JP)

(73) Assignee: Hoya Corporation, Tokyo (JP)

( * ) Notice: Subject to any disclaimer, the term of this patent is extended or adjusted under 35 U.S.C. 154(b) by 958 days.

(21) Appl. No.: 12/087,198

(22) PCT Filed: Dec. 26, 2006

(86) PCT No.: PCT/JP2006/325978
§ 371 (c)(1),
(2), (4) Date: Dec. 1, 2008

(87) PCT Pub. No.: WO2007/077848
PCT Pub. Date: Jul. 12, 2007

(65) Prior Publication Data
US 2009/0222122 A1    Sep. 3, 2009

(30) Foreign Application Priority Data
Dec. 26, 2005   (JP) ................................. 2005-371494

(51) Int. Cl.
| G06F 19/00 | (2006.01) |
| G01B 5/20 | (2006.01) |
| G01B 3/00 | (2006.01) |
| G02C 13/00 | (2006.01) |
| B24B 49/00 | (2006.01) |
| A61B 3/00 | (2006.01) |

(52) U.S. Cl. .............. 700/98; 351/178; 351/245; 451/5; 451/41; 451/43; 700/103; 700/117; 33/554; 33/555.1; 33/561

(58) Field of Classification Search ........................ None
See application file for complete search history.

(56) References Cited

U.S. PATENT DOCUMENTS 5,450,335 A * 9/1995 Kikuchi: Yoshihiro ....... 702/168
5,485,399 A * 1/1996 Saigo et al. ................... 351/178
(Continued)

FOREIGN PATENT DOCUMENTS

| EP | 1 475 187 A2 | 11/2004 |
| JP | 61-161513 A | 7/1986 |
| JP | 04-013539 A | 1/1992 |

(Continued)

*Primary Examiner* — Charles Kasenge
*Assistant Examiner* — Sunray Chang
(74) *Attorney, Agent, or Firm* — Blakely, Sokoloff, Taylor & Zafman

(57) ABSTRACT

An ordering terminal (10) installed on an order side of a spectacle lens has a correction function concerning a measurement error measured by a spectacle frame shape measurement device (13), and transmits information necessary for machining the spectacle lens including the spectacle frame shape information to a spectacle lens manufacture control device (20) in a factory. When correcting the measurement error, the circumference of a reference frame (30) for which a reference circumference as a reference is determined in advance is measured by the spectacle frame shape measurement device (13). A measurement circumference obtained on the basis of a measurement value of the circumference is compared with the reference circumference, and a correction value which corrects the spectacle frame shape information such that the measurement circumference approaches the reference circumference is employed as the correction value of the spectacle frame shape measurement device (13). A measurement error of the lens frame of a spectacle frame (4) in which the spectacle lens is to be actually mounted is corrected using the correction value. Hence, the measurement error of the spectacle frame shape measurement device (13) need not be corrected on the factory.

2 Claims, 20 Drawing Sheets

U.S. PATENT DOCUMENTS

| | | | |
|---|---|---|---|
| 5,802,731 A * | 9/1998 | Guillermin et al. | 33/502 |
| 5,926,247 A * | 7/1999 | Kimura | 351/41 |
| 6,249,991 B1 * | 6/2001 | Rarick et al. | 33/28 |
| 6,325,700 B1 * | 12/2001 | Mizuno et al. | 451/8 |
| 6,481,109 B2 * | 11/2002 | Rarick et al. | 33/28 |
| 6,618,952 B2 * | 9/2003 | Andrews et al. | 33/507 |
| 7,448,938 B2 * | 11/2008 | Inoguchi | 451/5 |
| 2002/0176052 A1 * | 11/2002 | Ueno | 351/245 |

FOREIGN PATENT DOCUMENTS

| | | |
|---|---|---|
| JP | 06-034923 | 2/1994 |
| JP | 2982991 B | 9/1999 |
| JP | 2002-162607 | 6/2002 |
| JP | 2003-287724 | 10/2003 |
| JP | 3548569 B | 4/2004 |
| JP | 2005-313300 A | 11/2005 |
| WO | WO 03/098181 | 11/2003 |

* cited by examiner

FIG.7C    FIG.7A
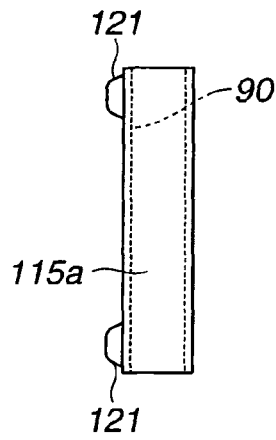
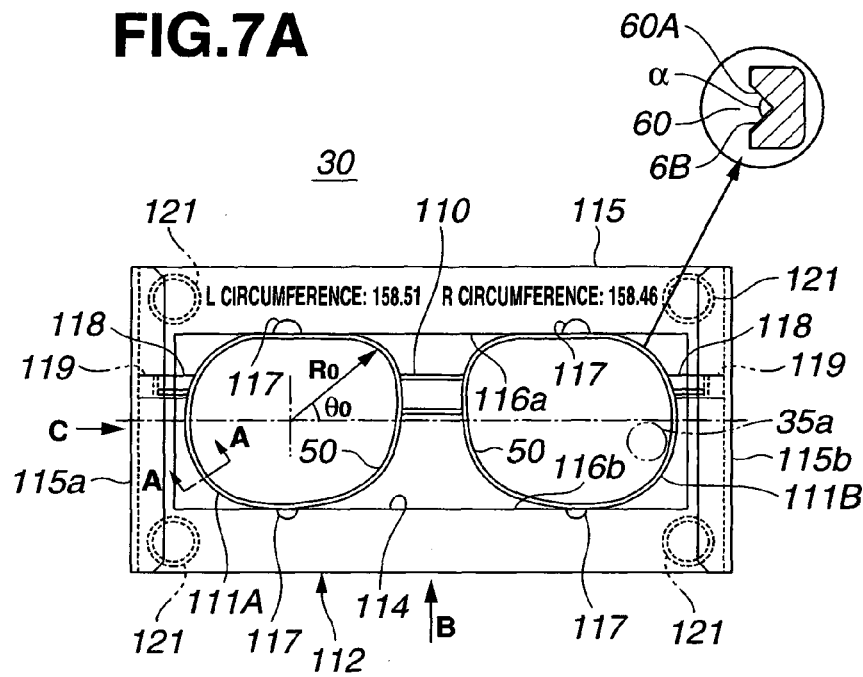
FIG.7B
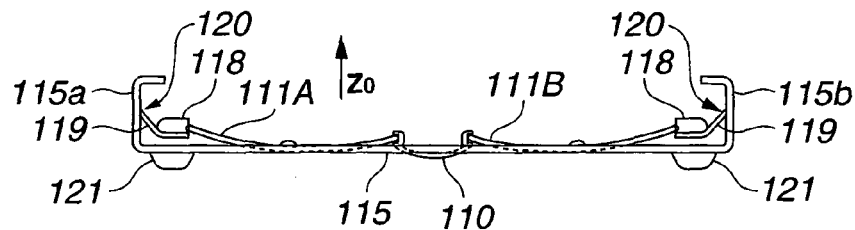

FIG.24
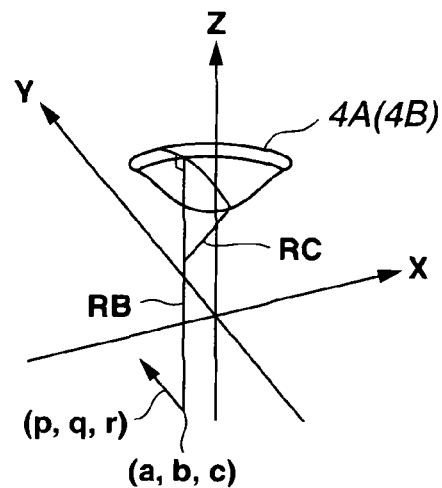
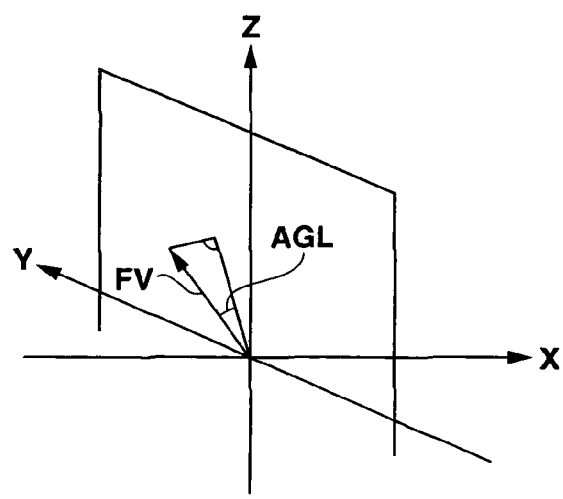
FIG.25A
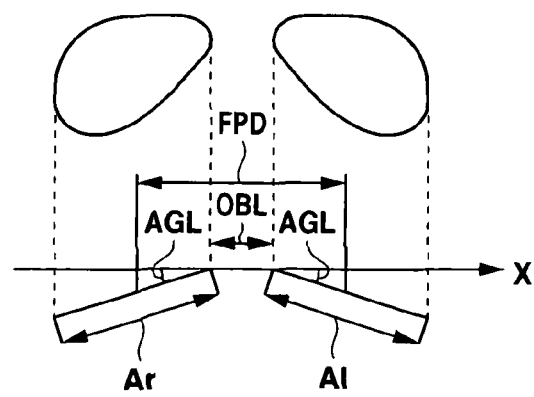
FIG.25B

SPECTACLE LENS SUPPLY SYSTEM, ORDERING SYSTEM, AND MANUFACTURING METHOD

The present patent application is a non-provisional application claiming the benefit of International Application No. PCT/JP2006/325978, filed Dec. 26, 2006.

TECHNICAL FIELD

The present invention relates to a spectacle lens supply system, ordering system, and manufacturing method and, more particularly, to a spectacle lens supply system, ordering system, and manufacturing method in which the frame shape data of a spectacle frame measured by a spectacle frame shape measurement device is corrected.

BACKGROUND ART

Conventionally, when a optician's store receives an order of a spectacle wearer, the spectacle lens is determined on the basis of the wearer's prescription and the shape and size of a spectacle frame to be used. The lens is machined on the basis of the prescription, lens information, and spectacle frame shape information. The machined spectacle lens is fitted in the lens frame of the spectacle frame.

Recently, however, as disclosed in, e.g., Japanese Patent Nos. 2982991 and 3548569, Japanese Patent Laid-Open No. 4-13539, and the like, a spectacle lens supply system or machining system is becoming popular not only in Japan but also overseas. According to this system, the optician's store and lens machining factory cooperate with each other. The optician's store practices optometry, writes a prescription, asks the factory to do spectacle lens edging. The optician's store receives the finished spectacle lens and fits it in the spectacle frame.

Spectacle lens edging at the factory includes edging of cutting a round uncut spectacle lens in accordance with the lens frame shape of the spectacle frame and beveling of forming a V-shaped projection (bevel) on the edge face of the edged spectacle lens.

In the following description of the present invention, the frame-like portions to which the spectacle lenses of spectacles are to be fitted will be referred to as a lens frame. The remaining portion of the spectacles excluding the spectacle lenses, that is, a portion comprising the pair of left and right lens frames, a bridge that connects the lens frames, and a pair of left and right temples connected to the lens frames through end pieces will be referred to as a spectacle frame.

In lens machining at the factory, the lens is machined without the spectacle frame at hand. It is thus important to grasp the accurate shape data on the spectacle frame. For this purpose, from the optician's store the factory side receives information necessary for fitting the lens in the frame including spectacle lens information, spectacle frame information including lens frame shape information, prescription values, and layout information, and performs a necessary calculation process on the basis of the received information, thus generating machining information used for machining the spectacle lens. A machining device machines the spectacle lens on the basis of the machining information.

The lens frame shape information on the spectacle frame includes three-dimensional measurement data R, $\theta$, and Z, a circumference, the tilt of the lens frame, a frame PD, and the like. R represents the radial displacement of the measurement unit (to be also referred to as a stylus hereinafter) of a three-dimensional spectacle frame shape measurement device within a horizontal plane, $\theta$ represents the rotational displacement of the stylus within the horizontal plane, and Z represents the displacement of the stylus in the direction of height (vertical direction).

Concerning the process of the spectacle frame information including the lens frame shape information, for example, the spectacle lens supply system described in Japanese Patent No. 3548569 described above discloses the process of more accurate lens frame information such as the circumference of the inner circumferential surface of the lens frame, the face form angle, and the like. Japanese Patent Laid-Open No. 4-13539 discloses a central machining system in a large-scale spectacle chain store. The central machining system is based on the consideration of a change of the order content and re-machining of the manufacture, and discloses spectacle frame shape measurement and correction of a machine error in an edging device.

DISCLOSURE OF INVENTION

Problems to be Solved by the Invention

The prevalence of the conventional supply system described above led to variations in equipment such as the presence of a plurality of communication edging order systems and the presence of a dedicated spectacle frame shape measurement device and machining device used in these systems. These systems and devices, however, lack compatibility, and the order side must prepare necessary devices for the individual systems. In recent years, commonization of these devices is in progress.

In this case, even when lens frames of the same shapes are measured, since the machine types of the spectacle frame shape measurement devices differ, shape correction is needed. This is because differences in machine type of the spectacle frame shape measurement device lead to a variety of differences in structure, operation, and calculating process of the device such as the shape and material of the stylus, how to apply the stylus to the spectacle frame, the operation of the stylus, the calculation processing method, the number of measurement points, and the like. More specifically, as a stylus B, a stylus with a head shape as shown in FIG. 27A, i.e., a stylus comprising a disc-like head $B_1$ with an outer surface that forms a V-shaped ridge, a stylus comprising a spherical head $B_2$ as shown in FIG. 27B, or a stylus comprising a tapered head $B_3$ as shown in FIG. 27C is used. Such a head is brought into contact with a V-shaped frame groove C formed in the inner circumferential surface of a lens frame A of the spectacle frame, and the frame groove C is measured. Accordingly, if the head shape of the stylus B changes, the contact state of the head with the frame groove C changes, and the contact operation of the stylus B also changes.

According to a method of measuring the frame groove by bringing the head $B_1$, $B_2$, or $B_3$ of the stylus B into direct contact with the groove wall of the V-shaped frame groove C, the stylus head is urged against the groove wall with a constant contact pressure so that the stylus head $B_1$, $B_2$, or $B_3$ does not disengage from the frame groove C, and the stylus B is moved to measure the frame shape and circumference. In this case, the contact pressure of the stylus head with respect to the groove wall changes from one measurement device to another in accordance with the difference in structure. The fitting state of the stylus B with the frame groove C also changes in accordance with the shape of the stylus head $B_1$, $B_2$, or $B_3$. If the lens frame A is thin and flexible, the contact pressure of the stylus head may deform the lens frame shape. In this manner, if the type of the spectacle frame shape measurement device changes, the shape of the stylus B also changes. In view of this, usually, each spectacle frame shape measurement device corrects the measurement data that matches the measurement mechanism of individual machine type. The measurement data, however, cannot be corrected completely, and a measurement error specific to the machine type is present.

According to a method of measuring the frame groove by bringing the head $B_1$, $B_2$, or $B_3$ of the stylus B into direct contact with the groove wall of the V-shaped frame groove C, the stylus head is urged against the groove wall with a constant contact pressure so that the stylus head $B_1$, $B_2$, or $B_3$ does not disengage from the frame groove C, and the stylus B is moved to measure the frame shape and circumference. In this case, the contact pressure of the stylus head with respect to the groove wall changes from one measurement device to another in accordance with the difference in structure. The fitting state of the stylus B with the frame groove C also changes in accordance with the shape of the stylus head $B_1$, $B_2$, or $B_3$. If the lens frame A is thin and flexible, the contact pressure of the stylus head may deform the lens frame shape. In this manner, if the type of the spectacle frame shape measurement device changes, the shape of the stylus B also changes. In view of this, usually, each spectacle frame shape measurement device corrects the measurement data that matches the measurement mechanism of individual machine type. The measurement data, however, cannot be corrected completely, and a measurement error specific to the machine type is present.

Therefore, the manufacturer side must also prepare a correction value that matches the machine type of the spectacle frame shape measurement device. Even if the machine type of the spectacle frame shape measurement device does not change, when the device is used over a long period of time, the components may be worn or degraded over time. Hence, an up-to-date correction value must always be prepared, or some means for coping with such a change must be provided.

It is, however, impossible in practice to grasp the manufactures, operations, processing methods, measurement errors, and the like of all the machine types (including those of different makers) of the spectacle frame shape measurement device and manage the correction values of the individual machine types.

The orderer side cannot but use only a measurement device of the machine type with which the manufacturer can cope. This narrows the choice of products and manufacturing cost to impair the simplicity of the system.

The present invention has been made to solve the conventional problems described above, and has as its object to provide a spectacle lens supply system, ordering system, and manufacturing method which can further promote a specialized system for spectacle lens machining.

Means of Solution to the Problems

In order to achieve the above object, a spectacle lens supply system according to the present invention comprises a spectacle frame shape measurement device which three-dimensionally measures a lens frame shape of a spectacle frame to generate spectacle frame shape information, an ordering terminal which has a function of correcting the spectacle frame shape information generated by the spectacle frame shape measurement device, generates order information on the basis of the corrected spectacle frame shape information, and transmits the generated order information to a spectacle lens manufacturer, and a spectacle lens manufacture control device which generates machining information on the spectacle lens on the basis of the order information transmitted from the ordering terminal, the ordering terminal comprising a measurement data correction unit which corrects the spectacle frame shape information generated by the spectacle frame shape measurement device, and an order data generation unit which generates order information on the basis of the spectacle frame shape information corrected by the measurement data correction unit.

A spectacle lens ordering system according to the present invention comprises a spectacle frame shape measurement device which three-dimensionally measures a lens frame shape of a spectacle frame to generate spectacle frame shape information, and an ordering terminal which has a function of correcting the spectacle frame shape information generated by the spectacle frame shape measurement device, generates order information on the basis of the corrected spectacle frame shape information, and transmits the generated order information to a spectacle lens manufacturer, the ordering terminal comprising a measurement data correction unit which corrects a measurement error in the spectacle frame shape information generated by the spectacle frame shape measurement device, and an order data generation unit which generates order information on the basis of the spectacle frame shape information corrected by the measurement data correction unit.

A spectacle lens manufacturing method according to the present invention comprises the steps of calculating, on the basis of spectacle frame shape information obtained by a spectacle lens frame measurement device through measurement of a lens frame shape of a reference frame having a reference circumference as a reference, a correction value of a measurement error of the spectacle frame shape measurement device, correcting, using the correction value, the spectacle frame shape information obtained by the spectacle frame shape measurement device through measurement of a lens frame shape of a spectacle frame, transmitting order information including the corrected spectacle frame shape information to a spectacle lens manufacturer using an ordering terminal, generating machining information on the spectacle lens on the basis of the order information transmitted by the ordering terminal, and edging the spectacle lens on the basis of the generated machining information.

Effects of the Invention

According to the spectacle lens supply system, ordering system, and manufacturing method of the present invention, the measurement error of the spectacle frame shape measurement device is corrected by an ordering terminal, and the corrected data is transmitted to the spectacle lens manufacture control device. This eliminates the need for the spectacle lens manufacture control device to correct the measurement error of the spectacle frame shape measurement device. As a result, spectacle lens machining can be performed efficiently.

As the ordering terminal comprises a correction function for the measurement error of the spectacle frame shape measurement device, it can correct a measurement error of the same machine type or among different machine types. Thus, a large number of types of spectacle frame shape measurement devices can be dealt easily without changing the manufacturer side system.

BRIEF DESCRIPTION OF DRAWINGS

FIG. 7A is a front view showing a reference frame;

FIG. 7B is a view seen from the direction of an arrow B in FIG. 7A;

FIG. 7C is a view seen from the direction of an arrow C in FIG. 7A;

FIG. 24 is a perspective view of the lens frame to obtain the equation of a toric surface;

FIG. 25A is a perspective view of a pitch angle AGN of the lens frame;

FIG. 25B is a view to explain calculation of the pitch angle AGN of the lens frame and of a frame PD;

BEST MODE FOR CARRYING OUT THE INVENTION

Figure 1:
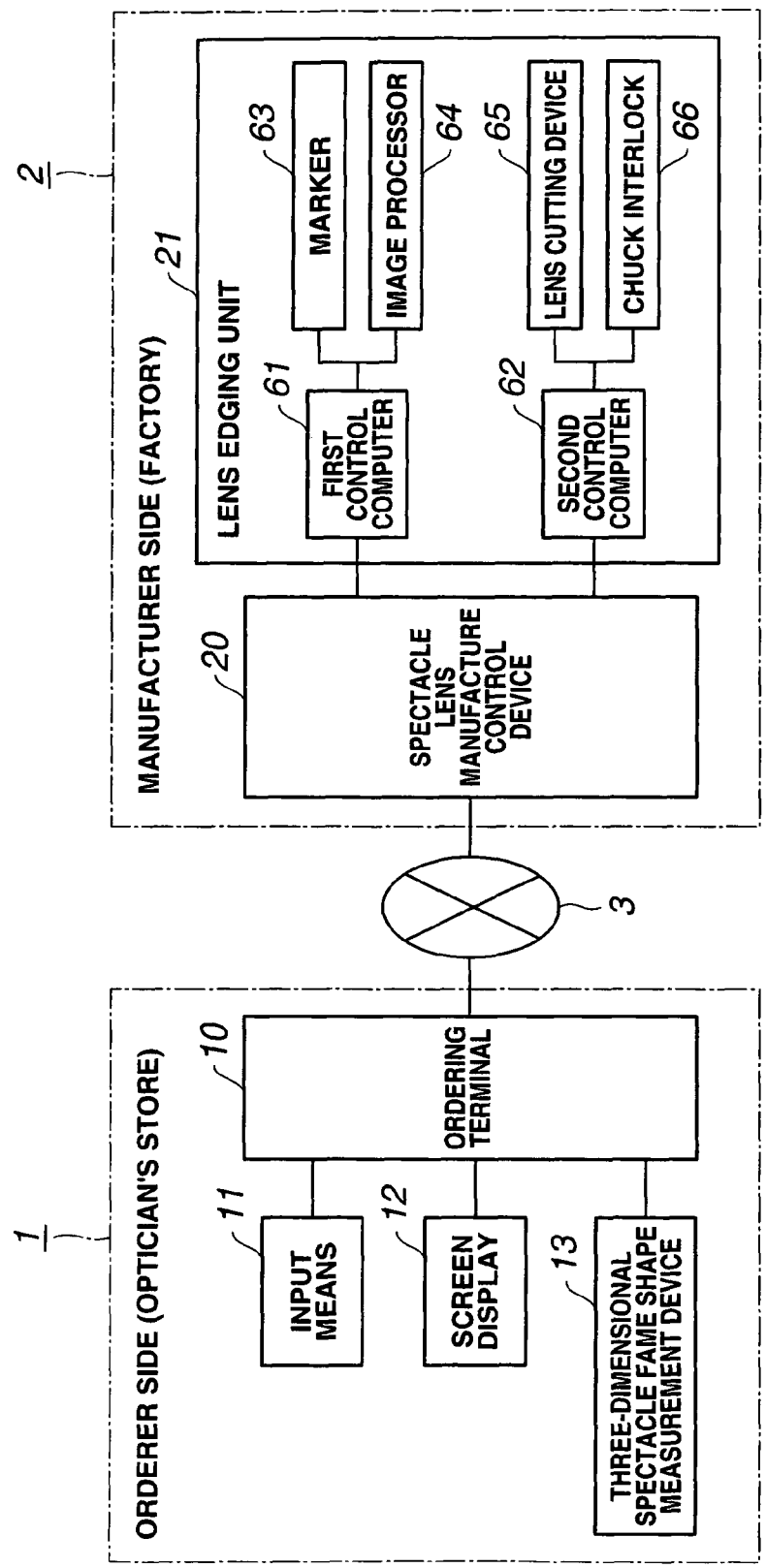
FIG. 1 is a view showing the overall arrangement of a spectacle lens supply system according to the present invention.

The present invention will be described hereinafter on the basis of an embodiment shown in the drawings.

Figure 2:
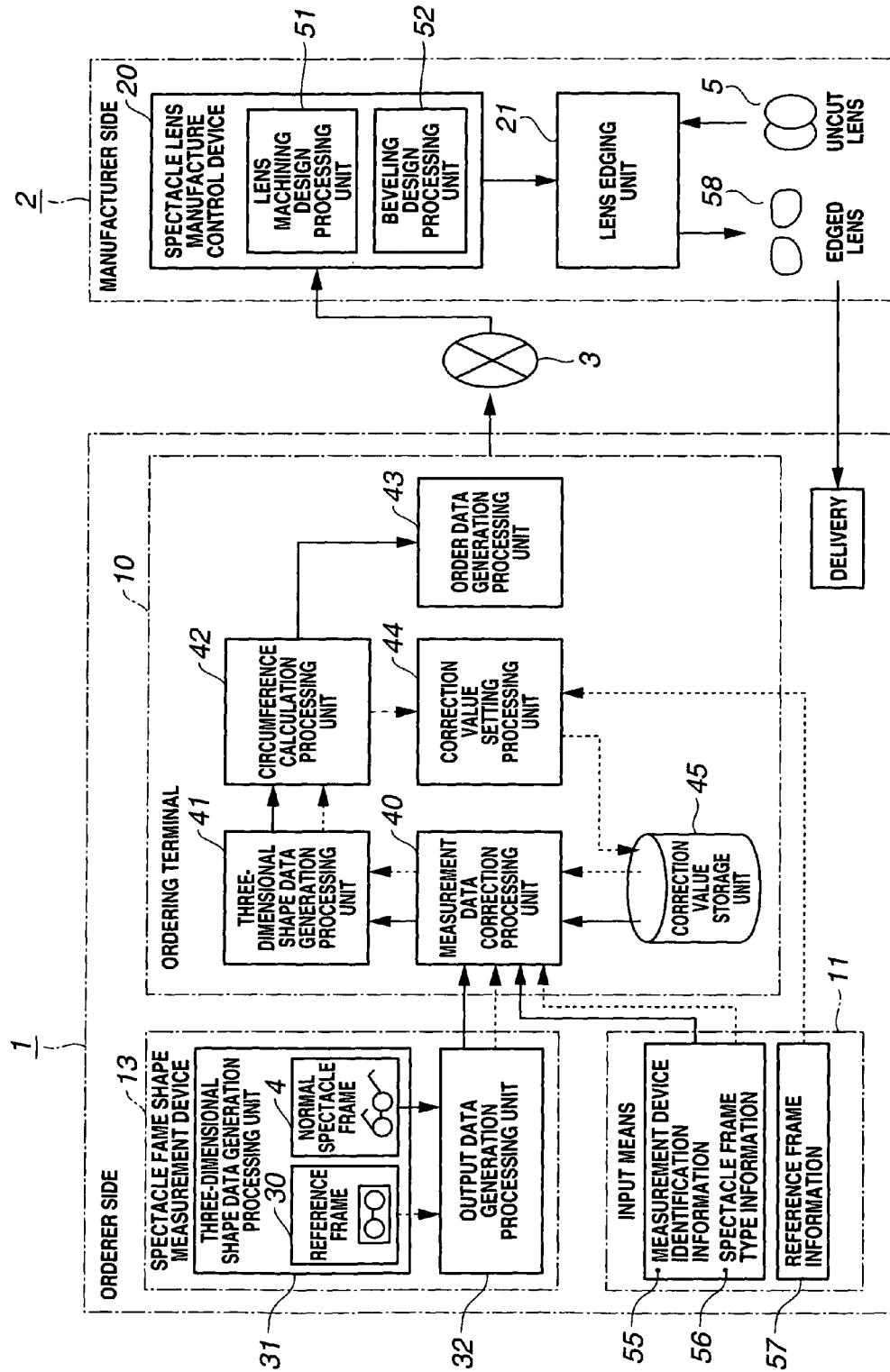
FIG. 2 is a block diagram mainly focused on the processing sequence of the supply system.

Referring to FIGS. 1 and 2, a optician's store 1 as an orderer side who orders manufacture of spectacle lenses to a manufacturer side (to be also referred to as a factory hereinafter) 2 comprises an ordering terminal 10 and a spectacle frame shape measurement device 13 which three-dimensionally measures the lens frame shape of a spectacle frame 4. The factory 2 comprises a spectacle lens manufacture control device 20 and lens edging unit 21.

The ordering terminal 10 of the optician's store 1 employs an input means 11 such as a keyboard, mouse, or barcode reader, a screen display 12 such as a CRT or liquid crystal display, and a computer comprising a CPU (not shown), communication means, and the like. The ordering terminal 10 performs a process of ordering the manufacture of the spectacle lens to the factory 2 on the basis of spectacle frame shape information from the spectacle frame shape measurement device 13 and is connected to the spectacle lens manufacture control device 20 via a communication medium 3 to be able to exchange information. The input means 11 is used to input information such as spectacle lens information and prescription values to the ordering terminal 10.

The ordering terminal 10 may be an exclusive computer, or a general purpose computer in which lens ordering software is installed. The network of the factory 2 or a relay station may be provided with a WWW (World Wide Web) server, and an order may be placed by displaying an ordering document registered to the WWW server on the screen by the WWW browser of the ordering terminal 10.

The communication medium 3 may use, e.g., a public line, a dedicated line, or the Internet. A relay station may be provided midway along the communication medium 3. The orderer side will be exemplified by the optician's store 1. However, the orderer side is not limited to the optician's store 1 but can be an ophthalmologist or a lens maker's branch. Although FIG. 1 shows only one optician's store 1 as the orderer side, a large number of orderers are in practice connected to the spectacle lens manufacture control device 20 of the factory 2 via the communication medium 3.

The supply system will be described in detail with reference to FIG. 2. In FIG. 2, broken line arrows indicate the sequence of the process of setting the correction value of the shape data measured by the spectacle frame shape measurement device 13 using a reference frame 30. Solid line arrows indicate the sequence of the process including measurement of the frame shape of the spectacle frame 4 by the spectacle frame shape measurement device 13, edging of the lens, and delivering of the completed lens to the orderer side.

The spectacle frame shape measurement device 13 comprises a three-dimensional shape data generation processing unit 31 and output data generation processing unit 32. The three-dimensional shape data generation processing unit 31 comprises a program which measures the three-dimensional shape of the spectacle frame 4 or a calibration jig (to be referred to as a reference frame hereinafter) 30 to be mounted in the spectacle frame shape measurement device 13 and generates three-dimensional shape data. The output data generation processing unit 32 comprises a program which transforms the three-dimensional shape data obtained by the three-dimensional shape data generation processing unit 31 into two-dimensional shape data and approximate curved surface definition data and generates output data used for calculating a frame PD, a pitch angle, and the like. The reference frame 30 will be described later.

The ordering terminal 10 further comprises a measurement data correction processing unit (to be also referred to as a measurement data correction unit hereinafter) 40, three-dimensional formation data generation processing unit (to be also referred to as a shape data generation processing unit hereinafter) 41, circumference calculation processing unit (to be also referred to as a circumference calculation unit hereinafter) 42, output data generation processing unit (to be also referred to as an output data generation unit hereinafter) 43, correction value setting/processing unit (to be also referred to as a correction value setting unit hereinafter) 44, and correction value storage unit 45. The measurement data correction unit 40 serves to correct an error in the spectacle frame shape information generated by the spectacle frame shape measurement device 13 and comprises a program which corrects and processes the two-dimensional shape data sent from the output data generation processing unit 32 of the spectacle frame shape measurement device 13 on the basis of a preset correction value. The shape data generation unit 41 comprises a three-dimensional shape data generation processing program which generates three-dimensional shape data from the shape data corrected by the measurement data correction processing program of the measurement data correction unit 40. The circumference calculation unit 42 comprises a circumference calculation processing program which calculates and processes the circumference on the basis of the three-dimensional shape data formed by the three-dimensional shape data generation processing program of the shape data generation unit 41. The output data generation unit 43 comprises an output data generation processing program which calculates the frame PD, pitch angle, and the like on the basis of the three-dimensional shape data generated by the three-dimensional shape data generation processing program of the shape data generation unit 41, and outputs the calculated data, the circumference value calculated by the circumference calculation unit, and the like to the spectacle lens manufacture control device 20 in a predetermined data format. The correction value setting unit 44 comprises a correction value setting processing program which calculates a correction value for the shape data measured by the spectacle frame shape measurement device 13 on the basis of the measurement circumference of the reference frame 30 calculated by the circumference calculation processing program of the circumference calculation unit 42 and the reference circumference of the reference frame 30 which is known in advance. The correction value storage unit 45 stores the correction value set by the correction value setting processing program of the correction value setting unit 44. The correction value is stored in the correction value storage unit 45 such that it can be referred to from the spectacle frame shape measurement device 13 employed for the measurement and the spectacle frame type of the measured reference frame 30.

The spectacle lens manufacture control device 20 of the factory 2 serves to control the manufacture of the spectacle lens in accordance with a spectacle lens manufacture request from the ordering terminal 10 of the optician's store 1, more specifically, to control the lens edging system as the lens edging unit 21, and employs a computer comprising a CPU (not shown), an input means, a display, a connection means for connecting the ordering terminal 10, and the like.

The spectacle lens manufacture control device 20 comprises a means for accepting order information sent from the ordering terminal 10 and processing the order, a lens machining process design processing unit 51, a beveling design processing unit 52, and the like. The spectacle lens manufacture control device 20 also comprises a storage means (not shown) for storing various types of data necessary for the manufacture of the spectacle lens, a control means for controlling and managing various types of control computers, and the like. The lens machining process design processing unit 51 comprises a spectacle lens machining design data generating program which generates design data by calculating the shape of the optical surfaces (front and back surfaces) of the spectacle lens and the shape of the lens edge face on the basis of the contents of the accepted order and generates machining data necessary to machine a lens blank, a finished lens, and the like on the basis of the design data. The beveling design processing unit 52 comprises a beveling design data generating program which generates the beveling design data for the spectacle lens 5.

The ordering terminal 10 receives spectacle frame shape data measured by the spectacle frame shape measurement device 13 and information such as the spectacle lens information, prescription values, and the like from the input means 11. Upon reception of these pieces of information, the ordering terminal 10 corrects the spectacle frame shape data by a method to be described later, and transmits the correction data to the spectacle lens manufacture control device 20.

The measurement data correction unit 40 of the ordering terminal 10 receives spectacle frame shape measurement device identification information 55, spectacle frame type information 56, and reference frame information 57 from the input means 11. The spectacle frame shape measurement device identification information 55 and spectacle frame type information 56 are used when reading out the correction value employed when correcting the measurement data by the measurement data correction processing program. The reference frame information 57 is used when the correction value setting unit 44 calculates the correction value on the basis of the reference circumference of the reference frame 30.

Referring to FIG. 1, the lens edging unit 21 comprises first and second control computers 61 and 62. The first control computer 61 is connected to a marker 63 which forms a mark (three-point mark) on the optical center of a spectacle lens 5, and an image processor 64. The second control computer 62 is connected to a lens cutting device (machining device) 65 which edges the spectacle lens 5, and a chuck interlock 66.

Although not shown, the factory 2 also comprises a rough grinder (curve generator), a lapping and polishing machine, a lens polishing device, a focimeter, a thickness meter, a shape measurement unit which measures the bevel shape of a machined spectacle lens 58, and the like.

Figure 3:
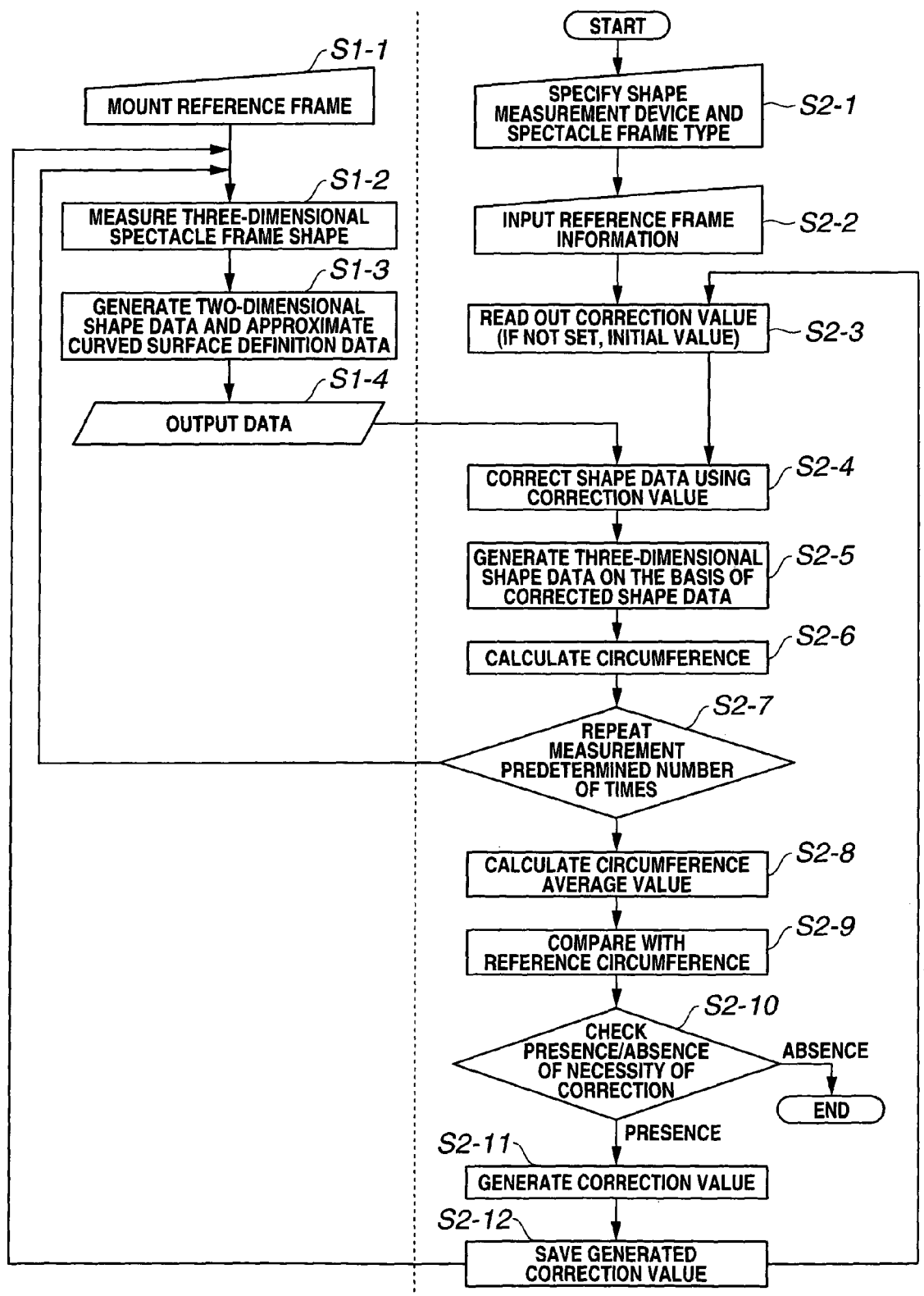
FIG. 3 is a flowchart showing the procedure of correcting the measurement result of a spectacle frame shape measurement device.

The procedure of setting the correction value of the shape data measured by the spectacle frame shape measurement device 13 will be described with reference to FIGS. 2 and 3. In FIG. 3, the flowchart on the left side shows processes and operations (steps S1-1 to S1-4) performed by the spectacle frame shape measurement device 13, and the flowchart on the right side shows processes and operations (steps S2-1 to S2-12) performed by the ordering terminal 10. In FIG. 3, the number after S indicates the step number.

(Step S2-1)

Upon reception of the measurement device identification information 55 and spectacle frame type information 56 from the input means 11, the ordering terminal 10 specifies the spectacle frame shape measurement device 13 to be used and the type of the spectacle frame 4 that matches the reference frame 30 to be used. To specify the type of the spectacle frame 4 means to specify the type of the spectacle frame 4 classified according to the material (e.g., a metal and a plastic material). This is because the measurement value is adversely affected by the material, and accordingly it is preferable to set the correction value for each type of the spectacle frame 4.

(Step S2-2)

The ordering terminal 10 also receives the reference frame information 57 as information on the reference frame 30 from the input means 11. The reference frame information 57 is the information on the reference frame including at least the reference circumference values of the left and right lens frames. The reference circumference value of each reference frame 30 may be stored in the storage means in advance. When a reference symbol given to each reference frame 30 as reference frame information is input, the reference circumference value of the given reference frame may be read out from the storage means and used for the process of the correction value setting/processing program.

Then, the measurement data correction unit 40 of the ordering terminal 10 reads out the correction value determined from the spectacle frame type and the specified measurement device stored in the correction value storage unit 45 in advance on the basis of the measurement device identification information 55 and spectacle frame type information 56 specified in step S2-1. If no correction value is set yet, an initial correction value that does not change the shape data is used (for example, if the correction value is a change amount in the radial direction, the initial value is 0; if it is a ratio to the reference circumference, the initial value is 1). The ordering terminal 10 sets the measurement data correction unit 40 in the standby mode to be able to receive the output data from the spectacle frame shape measurement device 13.

(Step S1-1)

The operator mounts the reference frame 30 in the spectacle frame shape measurement device 13. The spectacle frame shape measurement device 13, how to mount the reference frame 30 and in what state, and the like will be described later.

(Step S1-2)

When the reference frame 30 is mounted, the spectacle frame shape measurement device 13 starts operation to start measuring the frame shape of the reference frame 30. By this measurement, the left and right frame shapes of the reference frame 30 are generated as three-dimensional shape measurement data (Rn, θn, Zn) (n=1, 2, 3, . . . , N) which are cylindrical coordinate values.

The three-dimensional shape data generation processing unit 31 transforms the generated three-dimensional measurement data into orthogonal coordinate values to perform necessary correction and calculation, thus generating coordinate points (Xn, Yn, Zn) (n=1, 2, 3 . . . , N) of the left and right shape frames.

(Step S1-3)

The output data generation processing unit 32 of the spectacle frame shape measurement device 13 subjects the frame shape coordinate values to necessary calculation to generate two-dimensional frame shape data (Rn, θn) (n=1, 2, 3, . . . N) as polar coordinate points with reference to the geometric center of the frame shape as the origin, and approximate curved surface definition data.

(Step S1-4)

The output generation processing unit 32 also calculates the frame PD, the pitch angle, and other necessary data. The spectacle frame shape measurement device 13 outputs data such as the two-dimensional shape data, approximate curved surface definition data, frame PD, and pitch angle obtained in steps S1-3 and S1-4 to the ordering terminal 10. The calculation performed in the above steps S1-2 to S1-4 will be described in detail in steps S7-1 to S7-12 to be described later.

(Step S2-4)

When the ordering terminal 10 receives the frame shape data on the reference frame 30 from the spectacle frame shape measurement device 13, the correction unit 40 corrects the two-dimensional frame shape data using the correction value read out in step S2-3.

(Step S2-5)

The processing unit 41 generates three-dimensional frame shape data on the basis of the corrected two-dimensional frame shape data and sends the generated data to the circumference calculation unit 42.

(Step S2-6)

The circumference calculation unit 42 then calculates the circumference on the basis of the three-dimensional frame shape data.

The calculation performed in the above steps S2-4 to S2-6 will be described in detail in steps S7-14 and S7-15.

(Step S2-7)

The operations of steps S1-2 to S1-4 and steps S2-4 to S2-6 are repeated a predetermined number of times (e.g., 5 times) to calculate the average value of the circumference.

(Step S2-8)

The circumference calculation unit 42 calculates the average value of the plurality of obtained circumferences and determines it as the measurement circumference of the corresponding one of the left and right frames. For example, measurement is performed five times for each of the left and right frames of the reference frame 30, and the average value of the circumferences is calculated. Assume that the average value of the circumferences by five measurement operations is 162.27 mm for the right frame and 161.76 mm for the left frame.

(Step S2-9)

The circumference calculation unit 42 then calculates an error between the obtained average measurement circumference and the reference circumference of the reference frame 30.

left measurement error=left measurement circumference−left reference circumference right measurement error=right measurement circumference−right reference circumference For example, assuming that the reference circumference of the reference frame 30 is 161.27 mm for the right frame and 161.26 mm for the left frame, the measurement error is right measurement circumference−right reference circumference=162.27−161.27=1 mm left measurement circumference−left reference circumference=161.76−161.26=0.5 mm When the average value of the left and right circumferences is obtained, (1+0.5)/2=0.75 mm is obtained.
(Step S2-10)

The correction value setting unit 44 checks whether or not a correction value is to be set. This checking may be performed automatically by determining the allowable range of the correction value (for example, ±0.03 mm for the average value of the left and right circumferences) in advance, or may be determined by the operator by comparing the reference circumference with the measurement circumference. If the correction value setting unit 44 determines that correction is not necessary, the process ends without generating the correction value.
(Step S2-11)

When it is determined that correction is necessary, the correction value setting unit 44 generates a correction value. The correction value is obtained by dividing the average value of the left and right measurement errors by $2\pi$.

correction value=(left measurement error+right measurement error)/$2\pi$

Therefore, when the average value of the left and right circumferences is 0.75 mm, the correction value is $-0.75/2\pi = -0.12$ mm (Step S2-12)

The correction value generated by the correction value setting unit 44 is sent to the correction value storage unit 45 and saved for the corresponding spectacle frame shape measurement device 13 and the corresponding type of the spectacle frame 4.

The process of steps S1-2 to S1-4 and S2-3 to S2-12 is repeatedly performed until it is determined that correction is not necessary.

[Procedure of Correcting Measurement Data by Spectacle Frame Shape Measurement Device]

The sequence of the process since the spectacles are ordered until the machined spectacle lenses 58 are supplied will be described with reference to FIG. 2 and FIGS. 4 and 5. In FIG. 2, the process sequences indicated by solid line arrows include two types, i.e., "inquiry" and "order". "Inquiry" signifies that the optician's store 1 asks the factory 2 to report the lens shape anticipated at completion of lens machining including beveling. "Order" signifies that the optician's store 1 asks the factory 2 to fabricate beveled lenses 58 by edging the uncut spectacle lenses 5, and to deliver them.
(Step S5-1)

When the lens order inquiry processing program of the ordering terminal 10 of the optician's store 1 is started, the screen display 12 displays an order entry window. The operator of the optician's store 1 specifies the type of the lenses as the order target or inquiry target by the input means 11 while monitoring the order entry window. More specifically, the operator specifies machining including specification as to whether the lenses to be ordered or inquired are beveled lenses or lenses which are not to be subjected to edging or beveling, and specification to set the lens thickness to the necessary minimum value, specifies machining of chamfering the edge of a minus-power lens so the edge will not stand out and polishing the chamfered portion, and the like.
(Step S5-2)

The operator also specifies the lens color using the input means 11.
(Step S5-3)

The operator also inputs the lens prescription values, the lens machining specified values, spectacle frame information, layout information for specifying the eye point positions, bevel mode, bevel position, and bevel shape to the ordering terminal 10 using the input means 11. The bevel mode includes "1:1", "1:2", "copy convex", "copy frame", and "automatic bevel" depending on which portion of the lens edge the bevel is to be set. Any one of these modes is selected and input. For example, "copy convex" is the mode in which the bevel is set along the lens surface (front surface). The bevel position input is valid only when the bevel mode is "copy convex", "copy frame", or "automatic bevel", and is performed to specify how close to the back surface, from the lens front surface, the bevel front surface side bottom is to be located. This position can be specified in units of, e.g., 0.5 mm.
(Step S5-4)

The ordering terminal 10 checks whether or not the spectacle frame shape measurement device 13 has already measured the spectacle frame shape of the target spectacle frame 4. If YES, the process advances to step S5-11; if NO, the process advances to step S5-5.
(Step S5-5)

First, the ordering terminal 10 performs switching from the lens order inquiry processing program to the spectacle frame shape measurement program. The measurement number attached to the spectacle frame 4 to be shape-measured is input to the ordering terminal 10 by the input means 11. The spectacle frame type information 56 is input to the ordering terminal 10 by the input means 11. The ordering terminal 10 thus specifies the spectacle frame type (material) of the spectacle frame 4 to be shape-measured in the same manner as in step S2-1. The ordering terminal 10 also specifies whether or not frame bending is allowed.
(Step S5-6)

When the measurement device identification information 55 is input by the input means 11, the ordering terminal 10 specifies the spectacle frame shape measurement device 13 to be used for spectacle frame measurement in the same manner as in step S2-1.
(Step S5-7)

The correction unit 40 of the ordering terminal 10 reads out the correction value determined from the spectacle frame type and the specified measurement device stored in the correction value storage unit 45 in advance on the basis of the measurement device identification information 55 and spectacle frame type information 56 specified in steps S5-5 and S5-6. The measurement data correction unit 40 also stands by so that it can receive output data from the spectacle frame shape measurement device 13.
(Step S5-15)

When the spectacle frame 4 to be measured is mounted, the spectacle frame shape measurement device 13 starts measurement of the frame shape and circumference of the spectacle frame 4. How to mount the lens frame in what state and the like will be described later.
(Step S5-16)

The three-dimensional shape data generation processing unit 31 obtains the left and right frame shapes of the spectacle frame 4 measured by the spectacle frame shape measurement device 13 in the form of three-dimensional shape measurement data (Rn, θn, Zn) (n=1, 2, 3, . . . , N) as cylindrical coordinate values. The obtained three-dimensional shape measurement data are transformed into orthogonal coordinate values and subjected to necessary correction and calculation to generate left and right lens frame shape coordinate points (Xn, Yn, Zn) (n=1, 2, 3, . . . , N).

(Step S5-17)

The output data generation processing unit 32 of the spectacle frame shape measurement device 13 processes the obtained lens frame shape coordinate values to generate two-dimensional frame shape data (Rn, θn) (n=1, 2, 3, . . . , N) as polar coordinate points with reference to the geometric center of the lens frame shape as the origin, and approximate curved surface definition data.

(Step S5-18)

The output data generation processing unit 32 also calculates the frame PD, the pitch angle, and other necessary data. Data such as the two-dimensional frame shape data, approximate curved surface definition data, frame PD, pitch angle, and the like obtained in the above steps S5-17 and S5-18 are output to the measurement data correction unit 40 of the ordering terminal 10. The calculation performed in the above steps S5-16 to S5-18 will be described in detail in steps S7-1 to S7-12.

(Step S5-8)

Upon reception of the lens frame shape data on the spectacle frame 4 from the spectacle frame shape measurement device 13, the measurement data correction unit 40 of the ordering terminal 10 corrects the two-dimensional lens frame shape data using the correction value read out from the correction value storage unit 45 in step S5-7, and transmits the correction data to the shape data generation unit 41.

(Step S5-9)

Upon reception of the two-dimensional frame shape data corrected by the measurement data correction unit 40, the shape data generation unit 41 generates three-dimensional frame shape data and sends it to the circumference calculation unit 42.

(Step S5-10)

The circumference calculation unit 42 receives the three-dimensional frame shape data from the shape data generation unit 41 and calculates its circumference.

(Step S5-11)

If the spectacle frame shape has already been measured and the correction value storage unit 45 stores its result, the measurement number attached to the spectacle frame 4 is input to the ordering terminal 10 by the input means 11 to read out the stored measurement value.

(Step S5-12)

In accordance with the measurement number input by the input means 11, the ordering terminal 10 reads out the stored spectacle frame shape information for the corresponding spectacle frame 4 from the correction value storage unit 45.

(Step S5-13)

The ordering terminal 10 performs calculation on the basis of the above shape data, and the screen display 12 displays the calculation result. If the measurement value fluctuates largely or the left and right lens frame shapes differ largely, the screen display 12 displays an error message indicating this. When the screen display 12 displays the error message, the operator of the optician's store 1 performs inspection in accordance with the contents of the error message, and performs measurement again.

The order data generation unit 43 generates order data to be sent to the spectacle lens manufacture control device 20 on the basis of the shape data input and calculated in the above steps. Data on spectacle frame shape includes two-dimensional lens frame shape data, approximate curved surface definition data, frame PD (or DBL), pitch angle, circumference, and the like. Machining condition data as at least one of the spectacle lens information, spectacle frame information, prescription values, layout information, and machining designation information is also generated as order data. The calculation performed in the above steps S5-8 to S5-13 will be described in detail in steps S7-14 to S7-16.

(Step S5-14)

The order data generation unit 43 specifies "inquiry" or "order". Data such as the lens information, prescription values, spectacle frame information, two-dimensional lens frame shape data, approximate curved surface definition data, frame PD (or DBL), pitch angle, circumference, and the like obtained by performing the above steps are sent to the spectacle lens manufacture control device 20 via the communication medium 3.

The processing sequence (steps S6-1 to S6-3, S6-5, and S6-7) performed by the factory 2 and steps S6-4, S6-6, and S6-8 of checking and error display performed by the optician's store 1 upon transfer from the factory 2 will be described with reference to FIG. 5.

(Step S6-1)

As shown in FIG. 2, the spectacle lens manufacture control device 20 comprises the spectacle lens order accepting system unit, the spectacle lens machining design unit 51, and the beveling design unit 52. When data such as the lens information, prescription values, spectacle frame information, layout information, and bevel information are sent to the spectacle lens manufacture control device 20 from the ordering terminal 10 via the communication medium 3, the spectacle lens manufacture control device 20 starts the lens machining design unit 51 via the spectacle lens order accepting system unit. When the lens machining design unit 51 is started, the lens machining design processing program performs calculation. More specifically, a desired lens shape including the bevel shape is calculated.

The spectacle lens manufacture control device 20 checks whether or not the diameter of the specified lens is sufficient. If the lens diameter is insufficient, the insufficient direction and insufficient amount in the boxing system are calculated, and the process is returned to the spectacle lens order accepting system unit to display the calculated insufficient direction and insufficient amount on the ordering terminal 10 of the optician's store 1. If the lens diameter is sufficient, the front surface curve of the lens is determined. Then, the lens thickness is determined. When the lens thickness is determined, the back surface curve of the lens, the prism, and the prism base setting are calculated. This determines the entire shape of the lens before edging. The thickness of the edge of the entire periphery is measured for the radius vector of each frame direction to check whether or not a portion where the edge thickness is smaller than the required value exists. If such a portion exists, the insufficient direction and insufficient amount in the boxing system are calculated, and the process is returned to the spectacle lens order accepting system unit to display the calculated insufficient direction and insufficient amount on the screen display 12 of the optician's store 1. If the edge thickness of the entire periphery is sufficient, the lens weight, the maximum and minimum edge thicknesses and their directions, and the like are calculated. Then, a designation value for the spectacle lens manufacture control device 20 required for back surface machining of the lens is calculated. The above calculation process is necessary when the spectacle lens manufacture control device 20, the rough grinder, and the lapping and polishing machine polish the lens before edging. The various types of calculated values are transferred to the next step.

Assume that the inventory lens is specified and lens polishing before edging is not performed. The lens type and prescription values determine the lens diameter, lens thickness, front surface curve, and back surface curve in advance, and their values are stored. Therefore, these values are read out. Whether or not the lens diameter and edge thickness are insufficient is checked in the same manner as for the back surface machined article. Then, these values are transferred to the next step.

(Step S6-2)

As the beveling design unit 52 in the spectacle lens manufacture control device 20 is started via the spectacle lens order accepting system unit, beveling design is calculated. In the beveling design calculation, first, the three-dimensional data on the lens frame shape is corrected in accordance with the material of the spectacle frame 4, and an error in lens frame shape data resulting from the material of the spectacle frame 4 is corrected. Then, the positional relationship between the lens frame shape and the spectacle lens 5 is determined three-dimensionally on the basis of the eye point positions.

The beveling design unit 52 determines the machining origin serving as the reference for holding a lens when performing beveling, and a machining axis serving as the rotation axis, and coordinate-transforms the currently obtained data into machining coordinates. The three-dimensional bevel distal end shape (including the bevel locus) is determined in accordance with the specified bevel mode. At this time, the three-dimensional bevel distal end shape is to be deformed without changing the bevel circumference, and the anticipated deformation amount is calculated on this premise. The three-dimensional bevel distal end shape cannot be deformed when the bevel mode is the "copy frame" mode or the frame bending is not allowed. Thus, if the bevel cannot stand unless it is deformed, an error code informing this is output.

The beveling design unit 52 compares the calculated deformation amount with the deformation limit amount set for each material of the spectacle frame 4. If the calculated deformation amount exceeds the limit amount, the beveling design unit 52 outputs an error code informing this. When the three-dimensional bevel distal end shape is deformed, the eye point position shifts. Hence, the error in deformation amount is corrected. Also, an error in restoration is also corrected. These processes can be performed selectively. The beveling design unit 52 calculates the design of three-dimensional beveling in the above manner.

(Step S6-3)

Figure 4:
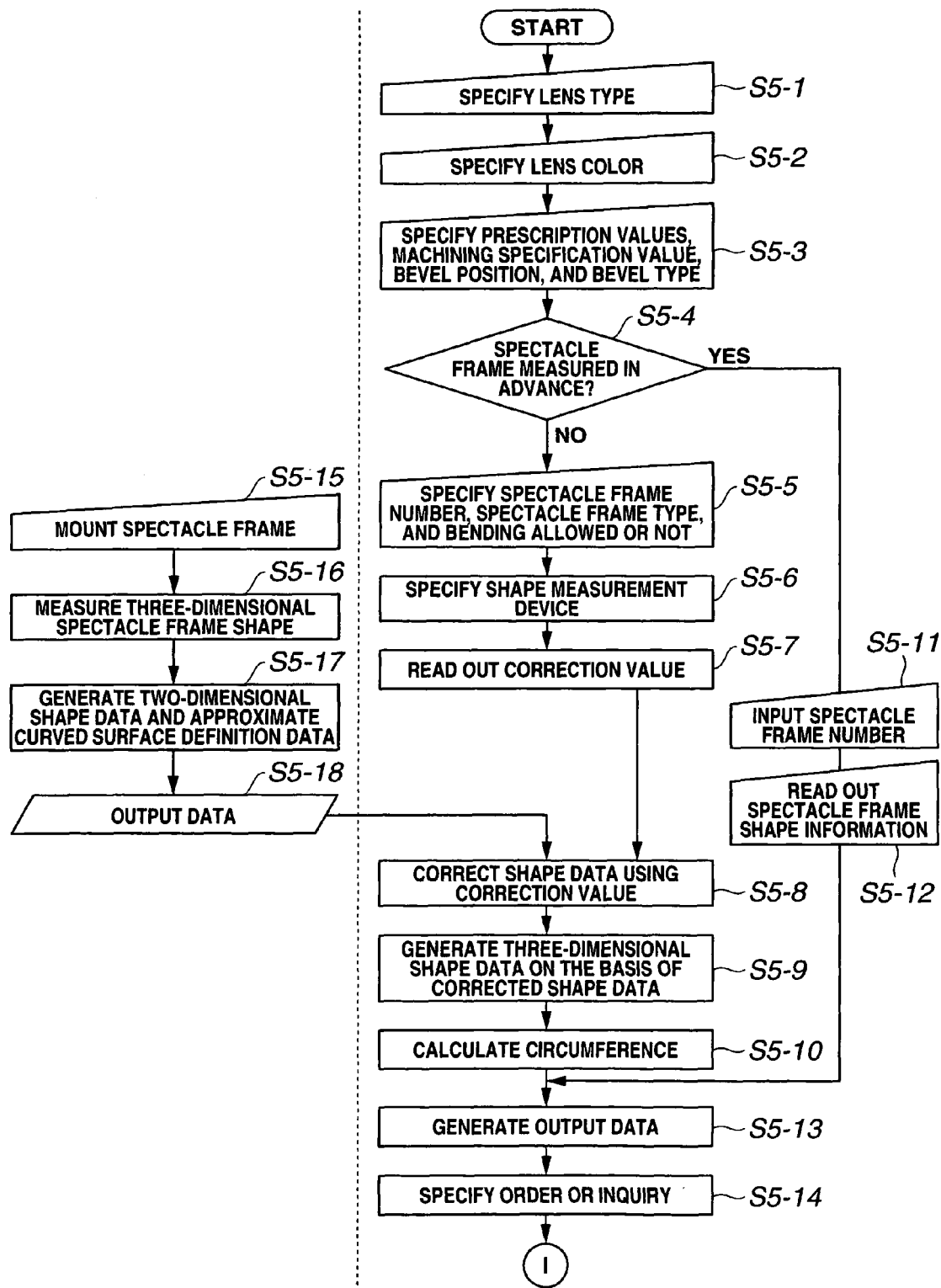
FIG. 4 is a flowchart showing the sequence of an initial input process at a optician's store.

If the specification in step S5-14 in FIG. 4 is "order", the spectacle lens manufacture control device 20 advances to step S6-5; if "inquiry", the spectacle lens manufacture control device 20 sends the inquiry result to the ordering terminal 10 via the communication medium 3, and advances to step S6-4.

(Step S6-4)

On the basis of the inquiry result sent from the spectacle lens manufacture control device 20, the ordering terminal 10 displays the anticipated shape or error state of the lens upon completion of beveling on the screen display 12. The operator of the optician's store 1 changes or checks the specified input information in accordance with the display content. More specifically, if no error is present in machining design calculation in steps S6-1 and S6-2 in FIG. 5, the screen of the image display 12 displays an order entry reception window indicating the lens thickness and lens weight. Also, the screen of the image display 12 displays a layout check diagram visually indicating how the lenses are to be arranged in the spectacle frame in accordance with the specified layout information, and a stereograph seen from an arbitrary direction of the left and right lenses framed in the spectacle frame and arranged in the space. The screen of the image display 12 also sequentially displays a bevel check diagram indicating the lens shape and the positional relationship between the edge and bevel in detail, and left and right bevel balance diagrams in which the edge thicknesses and the bevel positions of the both, left and right lenses are developed along the corresponding bevels. If an error is present in machining design calculation in steps S6-1 and S6-2 in FIG. 5, the screen display 12 displays a message corresponding to the error content.

(Step S6-5)

Figure 5:
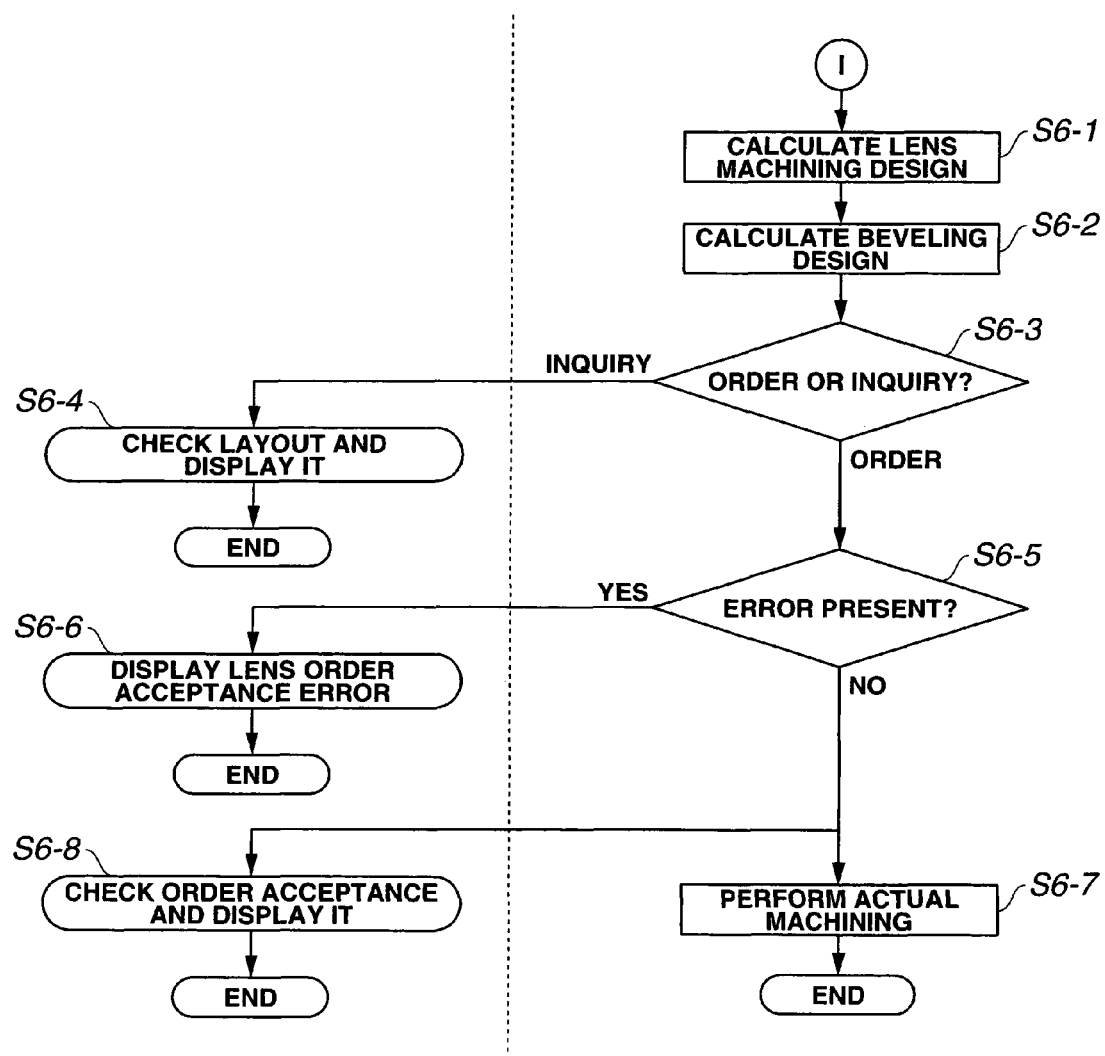
FIG. 5 is a flowchart showing the sequence of the process on the manufacturer side and steps of checking and error display performed by the order side in response to a transfer from the manufacturer side.

If the specification in step S5-14 in FIG. 4 is "order", this step is performed, and it is checked whether or not an error is present in machining design calculation in steps S6-1 and S6-2 in FIG. 5. If an error is present, this result is sent to the ordering terminal 10 via the communication medium 3, and the process advances to step S6-6. If no error is present, this result is sent to the ordering terminal 10 via the communication medium 3, and the process advances to steps S6-7 and S6-8.

(Step S6-7)

The spectacle lens manufacture control device 20 displays "order accepted" on the screen display 12 of the ordering terminal 10. Thus, the operator can confirm that an uncut lens or beveled lens that can be reliably framed in the lens frame was ordered.

(Step S6-8)

Since an error is present in lens machining design calculation or beveling design calculation, the ordered lens is a lens that cannot be machined. Hence, "order cannot be accepted" is displayed.

If "order" is specified in step S5-14 and no error is present in lens machining design calculation or beveling design calculation, actual machining such as lens back surface polishing, lens edging, and beveling is performed at the factory 2. More specifically, the lens machining design calculation result obtained in step S6-1 has been sent to the first control computer 61 in FIG. 1 in advance. The rough grinder and lapping and polishing machine (not shown) perform curved surface machining of the lens back surface in accordance with the sent calculation result. Furthermore, a device (not shown) performs coloring and surface treatment, thus performing machining processes up to before edging. If the use of an inventory lens that has undergone these machining processes is specified, these machining steps are skipped. Then, the quality test including the optical performance test and appearance test of the spectacle lens 58 which has undergone processes up to before edging is performed. This test employs a focimeter and thickness meter (not shown), and a three-point mark indicting the optical center is formed. If a spectacle lens 58 that has undergone processes up to before edging is ordered by the optician's store 1, its quality is tested, and the lens 58 is delivered to the optician's store 1.

On the basis of the result calculated in step S6-2, the first control computer 61, marker 63, image processor 64, and the like in FIG. 1 fix a lens holding block tool at a predetermined position on the lens 58. The lens 58 fixed by the block tool is mounted in the lens cutting device 65 and cut.

The spectacle lens manufacture control device 20 performs calculation similar to beveling design calculation of step S6-2, thus calculating the three-dimensional bevel distal end shape. In actual machining, an error may occur between the lens position grasped by the calculation and the actual lens position. This error is corrected when coordinate transformation into the working coordinate system is ended. The three-dimensional machining locus data on the machining coordinate system necessary for cutting with a grindstone having a predetermined radius is calculated on the basis of the calculated three-dimensional bevel distal end shape. The calculated machining locus data is sent to the NC-controlled lens cutting device 65 via the second control computer 62. The lens cutting device 65 performs edging and beveling of the lens 58 in accordance with the sent data. Finally, a bevel vertex shape measurement unit (not shown) measures the circumference and shape of the vertex of the bevel of the beveled lens. The ordering terminal 10 compares the designed bevel vertex circumference obtained by the calculation of step S6-2 with the measurement value measured by the shape measurement unit. If the difference between the two values does not exceed, e.g., 0.1 mm, it is determined that the lens is an acceptable product.

The spectacle frame shape measurement device and reference frame will be described with reference to FIGS. 6 and 7.

Figure 6:
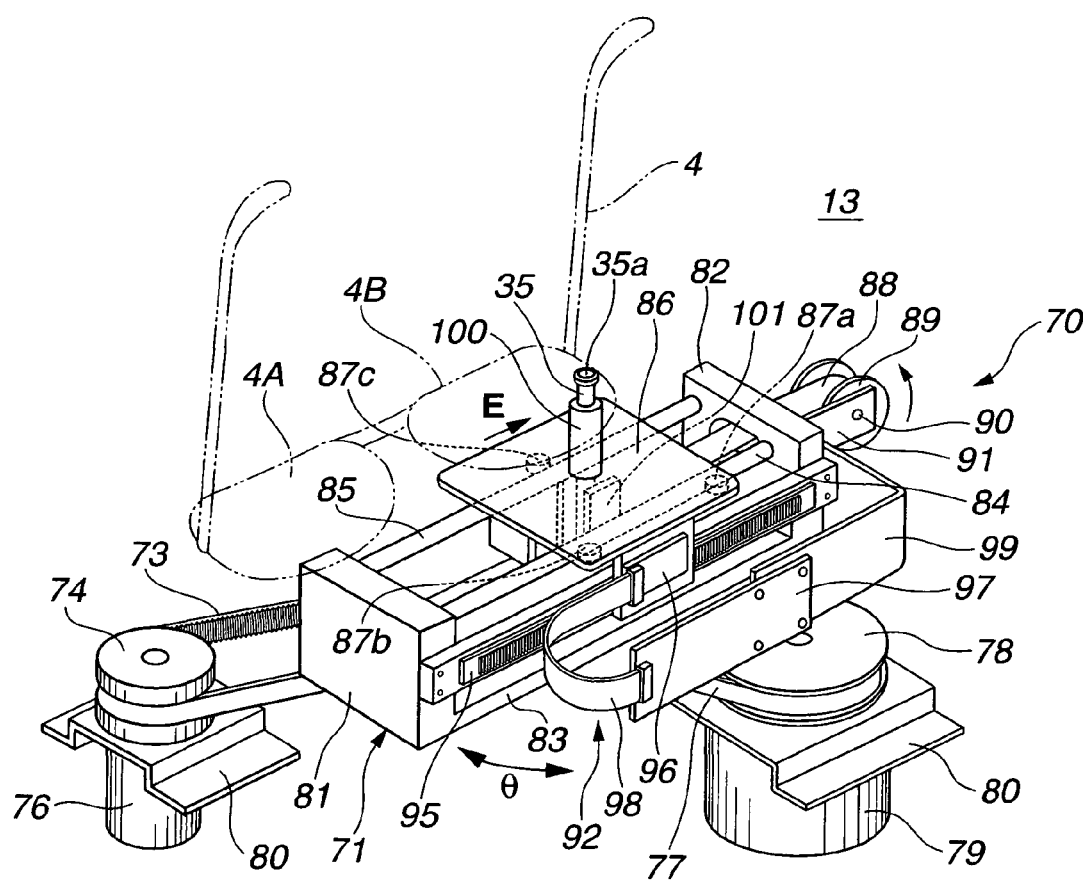
FIG. 6 is an outer appearance perspective view schematically showing the spectacle frame shape measurement device.

In FIG. 6, the spectacle frame shape measurement device 13 is identical to the shape measurement device described in FIG. 5 of Japanese Patent No. 3548569, and comprises a measurement unit 70 which measures the shapes of lens frames 4A and 4B of the spectacle frame 4 immovably held at a predetermined position by a spectacle frame holding means (not shown). The measurement unit 70 comprises a U-shaped rotary table 71. The rotary table 71 is rotatatively driven by a motor 76 in a direction θ through a timing pulley (not shown) attached to the surface of the rotary table 71, a timing belt 73, and a timing pulley 74. A rotary encoder 79 connected to the timing pulley (not shown) attached to the rotary table 71 through a timing belt 77 and timing pulley 78 detects the rotation angle of the rotary table 71. The motor 76 and rotary encoder 79 are fixed to a board 80, and the timing pulley (not shown) and the rotary table 71 are axially rotatatively supported on the board 80 through a bearing (not shown).

The rotary table 71 of the measurement unit 70 comprises two side plates 81 and 82 and a rectangular central plate 83 which connects the two side plates. Two slide guide shafts 84 and 85 horizontally extend between the side plates 81 and 82 to be parallel to each other. The slide guide shafts 84 and 85 are provided with a horizontal slide plate 86. To guide the slide guide shafts 84 and 85, the slide plate 86 comprises three rotatable slide guide rollers 87a, 87b, and 87c on its back surface. In this case, the two slide guide rollers 87a and 87b are in contact with one slide guide shaft 84, and the remaining slide guide roller 87c is in contact with the other slide guide shaft 85. The slide guide rollers 87a, 87b, and 87c roll along the slide guide shafts 84 and 85 to sandwich the slide guide shafts 84 and 85 from the two sides.

A constant force spring 88 biases the slide plate 86 toward one side plate 82 (in the direction of an arrow E). The constant force spring 88 is taken up by a bushing 89, and has one end fixed to the side plate 82 through a shaft 90 and bracket 91 and the other end fixed to the slide plate 86. During measurement, the constant force spring 88 urges a stylus 35 (to be described later) against a V-shaped frame groove 50 (see FIG. 11) formed on the inner circumferential surface of each of the lens frames 4A and 4B of the spectacle frame 4.

A reflection type linear encoder 92 serving as a displacement measurement scale measures the moving amount (R) of the slide plate 86. The linear encoder 92 comprises a scale 95 extending between the side plates 81 and 82 of the rotary table 71, a detector 96 which is fixed to the slide plate 86 and moves along the scale 95, an amplifier 97, and a flexible cable 98 which connects the amplifier 97 to the detector 96. The amplifier 97 is attached to the side plate 82 through a bracket 99.

When the slide plate 86 moves, the detector 96 moves while maintaining a constant distance with respect to the surface of the scale 95. In response to this movement, the detector 96 outputs a pulse signal to the amplifier 97 connected via the flexible cable 98. The amplifier 97 amplifies this signal and outputs it as a moving amount (R) via a counter (not shown).

Figure 27A:
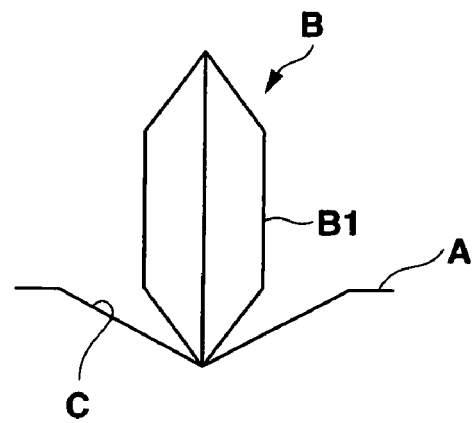
FIG. 27A is a view showing a stylus and a frame groove.
Figure 27B:
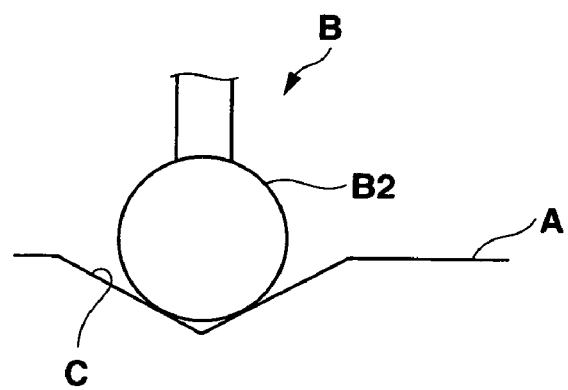
FIG. 27B is a view showing a stylus of a different type and the frame groove.
Figure 27C:
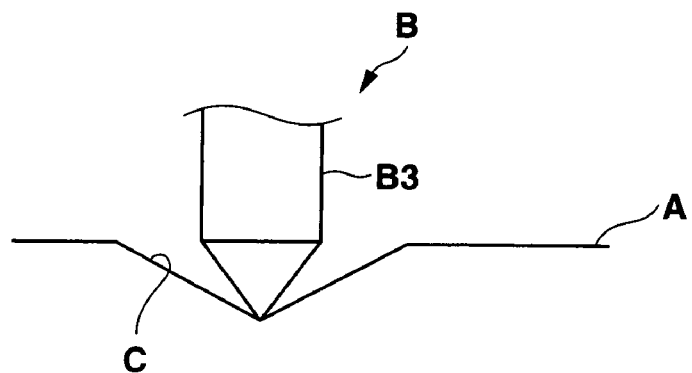
FIG. 27C is a view showing a stylus of a different type and the frame groove.

The stylus 35 which measures the frame groove 50 is axially supported in a sleeve 100 standing on the slide plate 86 through a bearing to be vertically movable (in the Z-axis direction) and rotatable. The stylus 35 comprises a head 35a with an outer surface that forms a V-shaped convex disc (the shape shown in FIG. 27A). During measurement, the head 35a comes into contact with the frame groove 50 formed in either one of the lens frames 4A and 4B, e.g., the lens frame 4A, by the operation of the constant force spring 88, and rolls along the frame groove 50 as the rotary table 71 rotates.

At this time, the stylus 35 moves in the radial direction to conform to the shape of the lens frame 4A. The linear encoder 92 measures the moving amount R in the radial direction through the sleeve 100 and slide plate 86, as described above.

The stylus 35 moves in the Z-axis direction along the curve of the lens frame 4A. A Z-axis measurement unit 101 formed as a displacement measurement scale detects the moving amount of the stylus 35 in the Z-axis direction. The Z-axis measurement unit 101 is fixed to the slide plate 86, and detects the movement of the stylus 35 in the Z-axis direction as a displacement amount Z in the Z-axis direction by a built-in charge-coupled element (CCD) line image sensor and a built-in light-emitting diode (LED) serving as the light source, which are arranged on the two sides of the stylus 35.

The operation of the spectacle frame shape measurement device 13 having the above arrangement will be described.

First, the spectacle frame 4 is fixed to the spectacle frame holding means (not shown). The head 35a of the stylus 35 is brought into contact with the frame groove 50 formed in the inner circumferential surface of the lens frame 4A (or 4B) of the spectacle frame 4, and the motor 76 is rotated by a control device (not shown). This rotates the rotary table 71 connected through the timing belt 73, and the stylus 35 rolls while in contact with the frame groove 50 of the lens frame 4A. The rotation of the measurement unit 70 is detected as the rotation angle (θ) of the rotary encoder 79 connected through the timing belt 77. The linear encoder 92 detects the moving amount of the stylus 35 in the radial direction as the moving amount R of the slide plate 86. The Z-axis measurement unit 101 detects the moving amount of the stylus 35 in the vertical direction as the moving amount Z of the stylus 35 in the Z-axis direction. Values R, θ, and Z which form the cylindrical coordinates are measured not continuously, but intermittently each time the rotation angle (θ) increases by a predetermined amount, and are input to the ordering terminal 10 shown in FIGS. 1 and 2. Hence, these input coordinate values will be expressed as three-dimensional measurement shape data (Rn, θn, Zn) (n=1, 2, 3, ... N) hereinafter. The suffix n represents the number of times of measurement during one rotation.

In this embodiment, point-series, vectors, and the like expressed as n=1, 2, 3, ..., N using suffix n line up spatially in the order of the values of the suffix n, and represent periodic data having a period N with respect to the suffix n.

When the rotary table 71 rotates one revolution and measurement of the lens frame 4A is ended, the spectacle frame holding means moves for a predetermined amount while holding the spectacle frame 4. This positions the stylus 35 in the other lens frame 4B. The stylus 35 is urged against the frame groove of the lens frame 4B to measure the shape of the lens frame 4B. As the predetermined slide amount of the spectacle frame holding means is set to a constant value in advance, the relative positional relationship between the two lens frames can be obtained from the preset slide amount value and the measurement data on the left and right lens frames 4A and 4B. The preset value is expressed three-dimensionally and determined as relative position data (δX, δY, δZ) hereinafter. These data are also input to the ordering terminal 10. Various types of constants, e.g., a radius SR, frame groove angle BA, frame groove width BW (see FIGS. 13 and 14), and the like of the stylus 35 are input to the ordering terminal 10 in advance.

The reference frame used for calibration of the spectacle frame shape measurement device 13 will be described.

A measurement error occurs in the spectacle frame shape measurement device 13 as described above due to, e.g., the use of a long period of time. The measurement error must be calibrated by using the reference frame 30 shown in FIG. 7. The reference frame 30 comprises lens frames 111A and 111B connected to each other by a bridge 110, and a frame body 112 to which the lens frames 111A and 111B are fixed. The frame body 112 is formed of a metal plate with rigidity higher than that of the lens frames 111A and 111B. The frame body 112 comprises a flat plate portion 115 with an opening 114, and a pair of left and right upright portions 115a and 115b integrally standing upright on the two ends of the flat plate portion 115. The opening 114 corresponds to the pair of lens frames 111A and 111B connected to each other by the bridge 110, and forms, e.g., a rectangle inscribed by the lens frames 111A and 111B.

The upper and lower portions of each of the lens frames 111A and 111B are respectively fixed to upper edge portion 116a and lower edge portion 116b of the flat plate portion 115, which face the opening 114, with an adhesive 117. End pieces 118 of the lens frames 111A and 111B are respectively bonded to the upright portions 115a and 115b through brackets 119 by welding or the like. In this manner, the lens frames 111A and 111B connected to each other by the bridge 110 are reinforced as they are firmly fixed to the metal frame body 112 having rigidity higher than that of the lens frames 111A and 111B. In FIG. 7, reference numerals 120 denote welding portions, and 121, legs.

Each of the lens frames 111A and 111B of the reference frame 30 with the above arrangement has, in its inner circumferential surface, a trace groove 60 (see FIG. 7A) which serves as a trace groove which is traced by the stylus 35. The trace groove 60 comprises an almost symmetric V-shaped groove having a predetermined open angle α, in the same manner as the frame groove 50 of the spectacle frame 4, thus having two tilt surfaces 60A and 60B. Since each of the lens frames 111A and 111B has a three-dimensional shape, the trace groove 60 has displacement $R_0$ (FIG. 7A) in the radial direction, displacement $\theta_0$ (FIG. 7A) in the rotational direction, and displacement $Z_0$ (FIG. 7B) in the direction of height. These displacements $R_0$, $\theta_0$, and $Z_0$ are measured in advance by the accurate spectacle frame shape measurement device 13 and determined as reference values. The circumference of the trace groove 60 calculated from the reference values is indicated as a reference circumference on, e.g., the flat plate portion 115 of the frame body 112 of the reference frame 30. According to this embodiment, the reference circumferences of the trace grooves 60 of the lens frames 111A and 111B are respectively indicated as "circumference L: 158.51 (mm)" and "circumference R: 158.46 (mm)" on the flat plate portion 115.

The reference frame 30 having the above arrangement is used to calibrate the measurement error of the spectacle frame shape measurement device 13 as the measurement target. At this time, the reference frame 30 is mounted in the spectacle frame shape measurement device 13 shown in FIG. 6, and the shape (three-dimensional displacement: $R_0$, $\theta_0$, $Z_0$) of the trace groove 60 of each of the lens frames 111A and 111B is measured. This shape measurement is performed by the stylus 35 in the same manner as the shape measurement of the frame groove of each of the lens frames 4A and 4B of the spectacle frame 4.

When measurement of the three-dimensional displacement ($R_0$, $\theta_0$, $Z_0$) of the trace groove 60 is ended, the circumference of the trace groove 60 is calculated from the three-dimensional displacement data. The operator adjusts the spectacle frame shape measurement device 13 to eliminate the error between the calculated circumference of the trace groove 60 and the reference circumference indicated on the reference frame 30, thus performing calibration of the spectacle frame shape measurement device 13.

According to the present invention, even if a spectacle frame shape measurement device 13 of a different machine type (of the same maker or another maker) is employed, the measurement result can be corrected. If the machine type changes, however, the output data content may change. In this case, the output data content is corrected by a transformation program registered in the ordering terminal 10.

A method of obtaining the spectacle frame shape data and a method of calculating the circumference by the spectacle frame shape measurement device 13 and ordering terminal 10 will be described with reference to the flowchart in FIG. 8.

Figure 8:
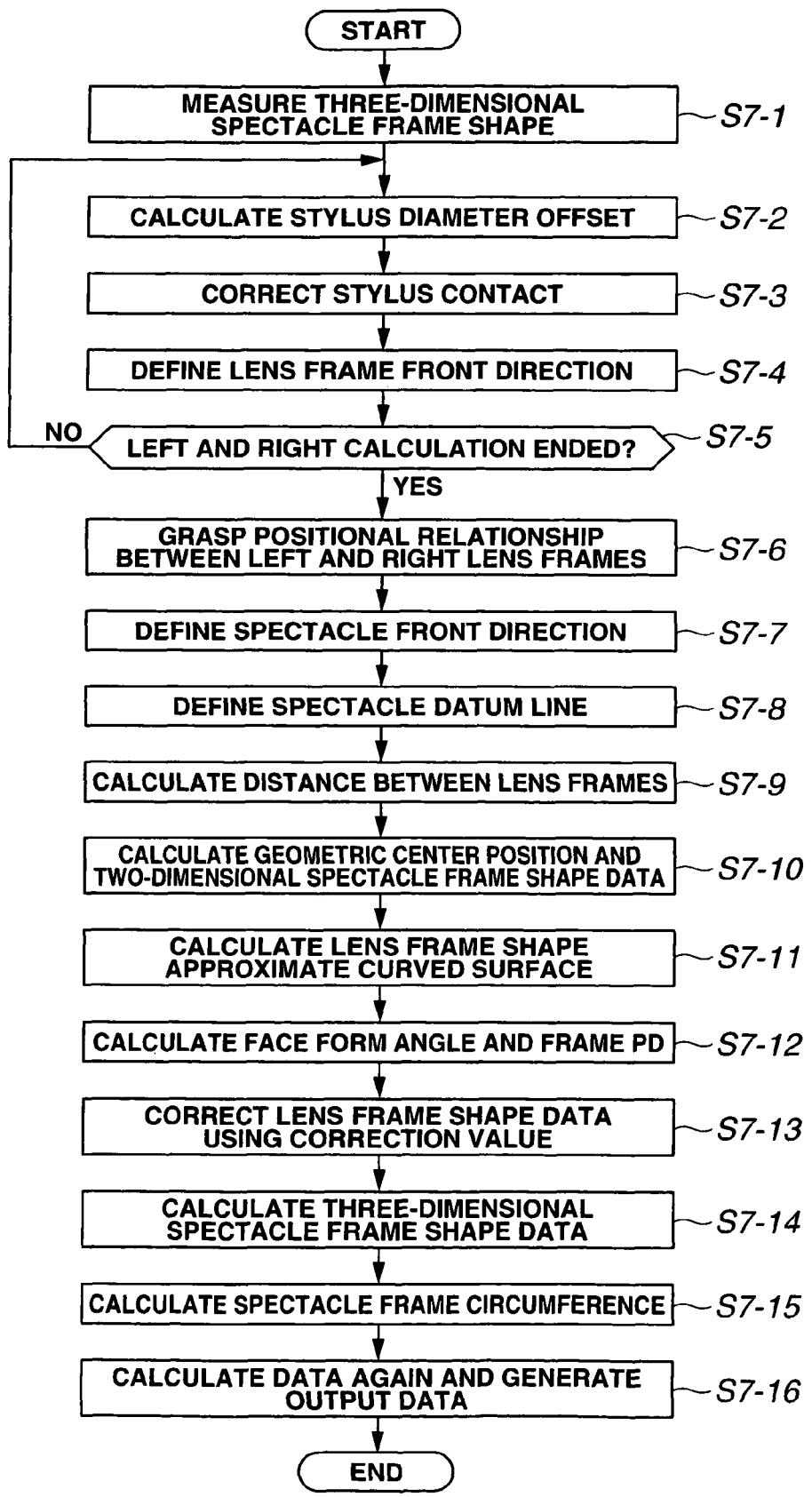
FIG. 8 is a flowchart showing the procedure of calculation performed by the spectacle frame shape measurement device and ordering terminal on the basis of the three-dimensional measurement shape data measured by the spectacle frame shape measurement device.

The procedure shown in steps S7-1 to S7-12 in FIG. 8 is a calculation procedure performed by the spectacle frame shape measurement device 13, and is employed in the process of S1-2 to S1-4 in FIG. 3 and S5-16 to S5-18 in FIG. 4. The procedure shown in S7-13 to S7-16 in FIG. 8 is a calculation procedure performed by the ordering terminal 10, and is employed in the process of S2-2 to S2-5 in FIG. 3 and S5-7 to S5-10 in FIG. 4. As shown in this flowchart, first, for the spectacle frame 4 held in the free space, respective types of data necessary for spectacle lens machining are obtained from the measurement data measured by the spectacle frame shape measurement device 13.

(Step S7-1)

As described above, the spectacle frame 4 to be measured or the reference frame 30 is mounted in the spectacle frame shape measurement device 13, and the spectacle frame shape measurement device 13 is actuated to measure the spectacle frame shape, thus obtaining the three-dimensional shape measurement data (Rn, θn, Zn) of each of the lens frames 4A and 4B.

(Step S7-2)

Strictly, the three-dimensional shape measurement data (Rn, θn, Zn) of each of the lens frames 4A and 4B is data indicating the locus of the central axis of the head 35a of the stylus 35 and does not indicate the frame groove shape of the spectacle frame 4. Thus, to obtain the accurate lens frame shape (the shape of the frame groove), an envelope drawn by the distal end 35b (the portion which is in contact with a bottom 170 of the frame groove 50; see FIG. 11) of the stylus head 35a must be obtained (in this embodiment, the calculation that obtains this envelope is called offset calculation). This will be described with reference to FIGS. 9 and 10.

Figure 9:
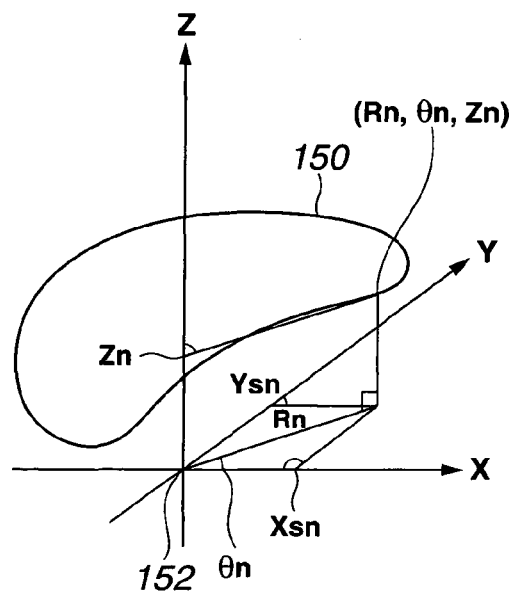
FIG. 9 is a perspective view of the locus of the central axis of a stylus head along the inner groove shape of one lens frame.

First, as shown in FIG. 9, the spectacle frame shape measurement device 13 transforms the measurement shape data (Rn, θn, Zn) (n=1, 2, 3, ..., N) as cylindrical coordinate values into orthogonal coordinate points (Xsn, Ysn, Zn) (n=1, 2, 3, ..., N) which share an origin 152 with the measurement shape data.

Figure 10:
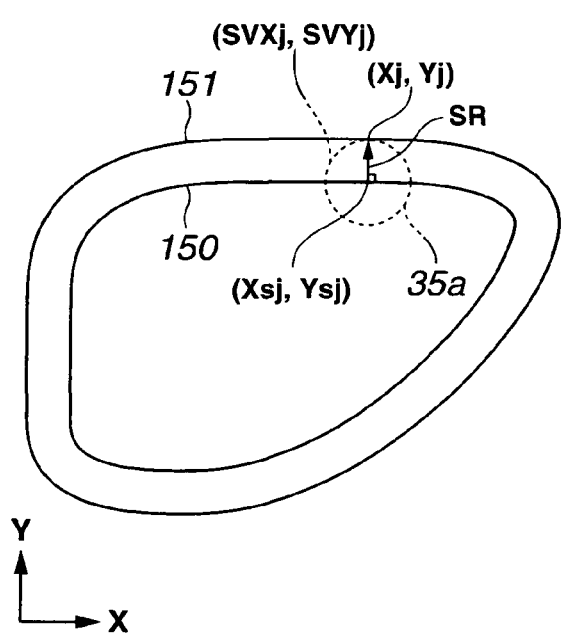
FIG. 10 is a plan view showing the locus of the central axis of the stylus head projected onto an X-Y plane and the inner groove shape of one lens frame.

Then, as shown in FIG. 10, paying attention to the point that a frame groove shape 151 is obtained by deforming a locus 150 of the central axis of the stylus head 35a by the radius SR of the stylus head 35a in the direction of normal, the three-dimensional shape data generation processing unit 31 of the spectacle frame shape measurement device 13 calculates the frame groove shape 151. More specifically, assuming that a normal vector of the jth point (Xsj, Ysj) of the locus 150 of the central axis of the stylus head 35$a$ is determined as (SVxj, SVyj), the orthogonal coordinate points (Xj, Yj) of the corresponding frame groove shape 151 can be obtained by adding the normal vector (SVxj, SVyj) to (Xsj, Ysj). This calculation is performed from j=1 to j=N to calculate the frame groove shape coordinate points (Xn, Yn) (n=1, 2, 3, ..., N). Note that the Z-axis coordinate value Zn of this frame groove shape 151 is equal to Zn in the orthogonal coordinate points (Xsn, Ysn, Zn).
(Step S7-3)

Even when measuring the lens frames 4A and 4B of the same spectacle frame 4, if the shape of the stylus 35 changes, the position of a distal end 35$b$ of the stylus head 35$a$ may change, and the stylus 35 may separate from the frame groove 50. Consequently, the frame groove shape 151 obtained in step S7-1 changes. Mechanically, the direction of diameter of the stylus head 35$a$ is always on that plane of the spectacle frame shape measurement device 13 which is perpendicular to the Z-axis direction, whereas the spectacle frame 4 has a shape that also changes in the Z-axis direction. Hence, the frame groove 50 may have a tilt with respect to that plane of the spectacle frame shape measurement device 13 which is perpendicular to the Z-axis direction. In this case as well, the position of the distal end 35$b$ of the stylus head 35$a$ changes in accordance with the tilt. This step is to obtain the circumferential shape of the bottom 170 of the frame groove 50 considering the change in position of the stylus head 35$a$ as described above. A description will be made with reference to FIGS. 11 to 16.

Figure 11:
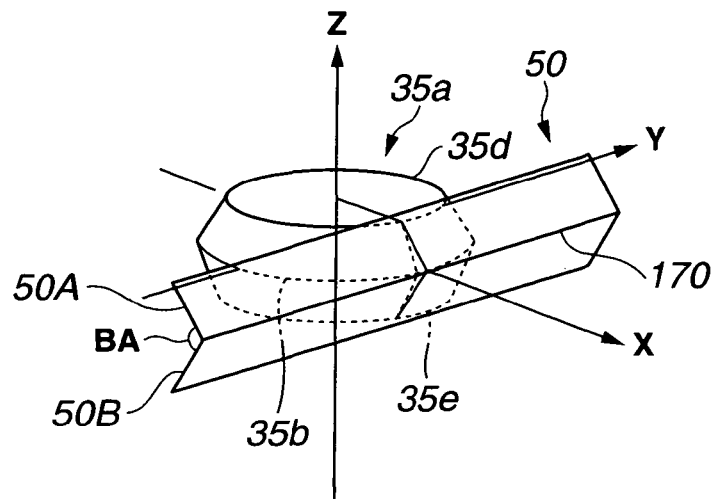
FIG. 11 is a perspective view showing a frame groove and the stylus head.
Figure 12:
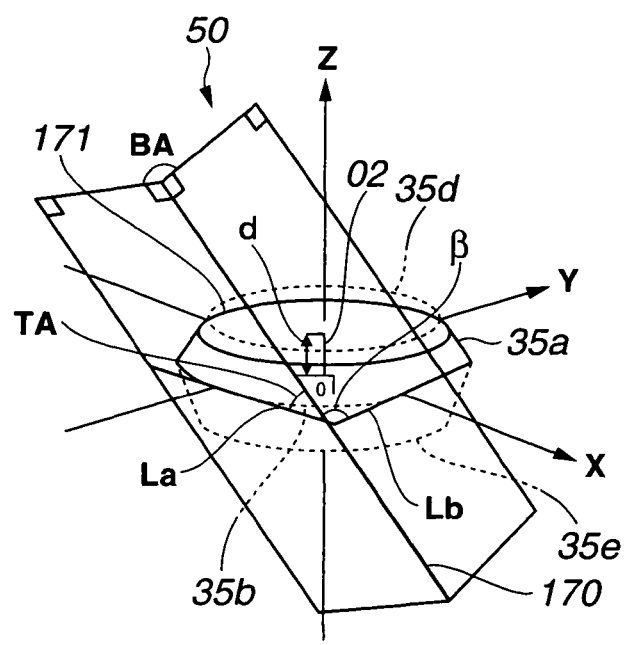
FIG. 12 is a perspective view showing an inner groove and the stylus head.

FIG. 11 shows a case in which the lens frame shape does not change in the Z-axis direction but the stylus head 35$a$ cannot come into contact with the bottom 170 of the frame groove 50. FIG. 12 shows a case in which the lens frame shape changes in the Z-axis direction, and accordingly the distal end 35$b$ of the stylus head 35$a$ cannot come into contact with the bottom 170 of the frame groove 50.

Figure 13A:
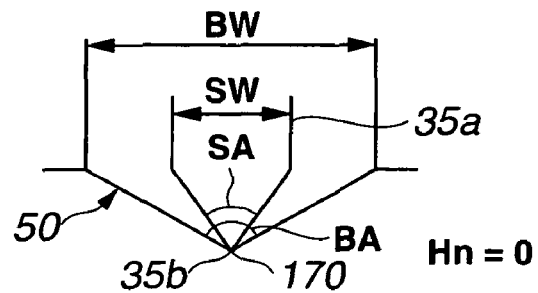
FIG. 13A is a Z-X plan view showing the contact state of the frame groove of the lens frame with the stylus head shown in FIG. 11.
Figure 13B:
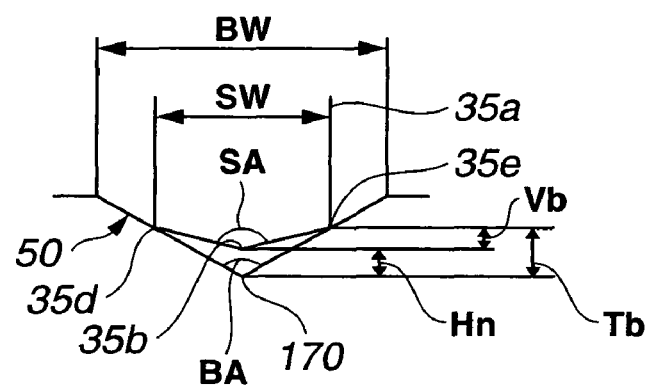
FIG. 13B is a Z-X plan view showing the contact state of the frame groove of the lens frame with the stylus head shown in FIG. 11.
Figure 13C:
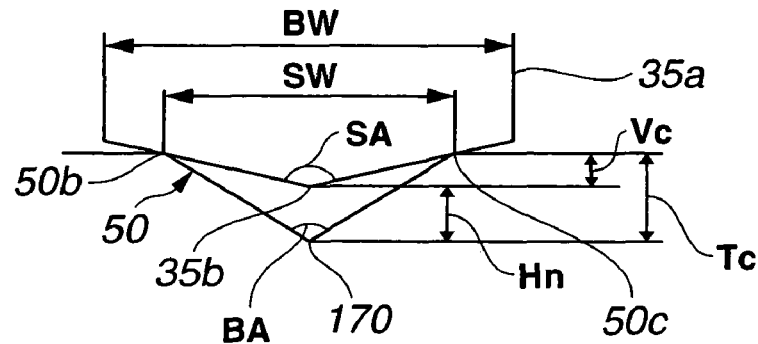
FIG. 13C is a Z-X plan view showing the contact state of the frame groove of the lens frame with the stylus head shown in FIG. 11.

When the lens frame shape does not change in the Z-axis directions as shown in FIG. 11, the contact state of the stylus head 35$a$ with the frame groove 50 changes in accordance with the shape of the stylus head 35$a$ even if the frame groove shape is the same, as shown in FIGS. 13A to 13C. Assuming that the distance between the distal end 35$b$ of the stylus head 35$a$ and the bottom 170 of the frame groove 50 is determined as Hn, the distance Hn can be obtained from the frame groove angle BA, the frame groove width BW, an angle SA of the distal end 35$b$ of the stylus head 35$a$, and a width SW of the stylus head 35$a$. More specifically, when SA≦BA as shown in FIG. 13A, the distal end 35$b$ of the stylus head 35$a$ is always in contact with the bottom 170 of the frame groove 50, and accordingly Hn=0 is obtained. When SA>BA and BW≧SW as shown in FIG. 13B, an upper end 35$d$ and lower end 35$e$ of the stylus head 35$a$ come into contact with the wall surface of the frame groove 50. Thus, a height Vb is obtained from SW and SA. A height Tb is obtained from SW and BA, and the distance Hn is obtained on the basis of the following equation:

$$Hn=Tb-Vb$$

Furthermore, when SA>BA and BW<SW as shown in FIG. 13C, the side surface of the stylus head 35$a$ is in contact with upper edges 50$b$ and 50$c$ of the frame groove 50. Thus, a height Vc is obtained from BW and SA, a height Tc is obtained from BW and BA, and the distance Hn is obtained on the basis of the following equation:

$$Hn=Tc-Vc$$

As shown in FIG. 12, when the lens frame shape changes in the Z-axis direction, the contact state of the stylus head 35$a$ with the frame groove 50 changes in accordance with a change in angle TA formed by the frame groove 50 and the plane perpendicular to the Z-axis direction. This change causes an error in the frame groove shape coordinate points (Xn, Yn) calculated in step S7-2. Thus, this error must be corrected.

Figure 14A:
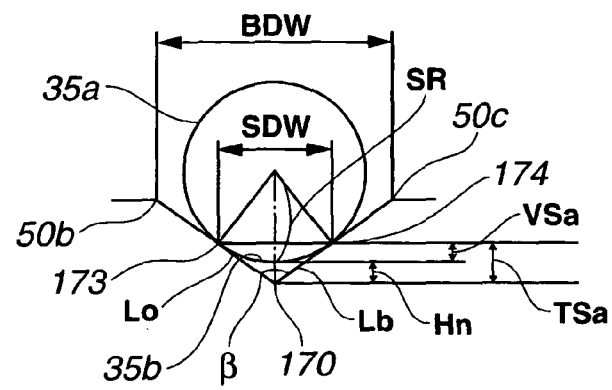
FIG. 14A is an X-Y plan view showing the frame groove and stylus head shown in FIG. 12.
Figure 14B:
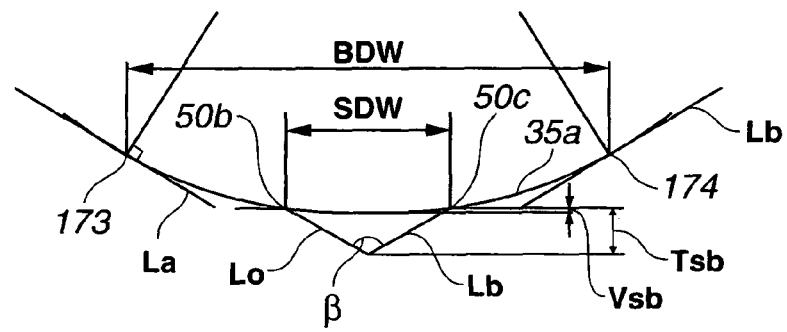
FIG. 14B is an X-Y plan view showing the frame groove and stylus head shown in FIG. 12.

More specifically, when the angle SA of the distal end 35$b$ of the stylus head 35$a$ is smaller than the frame groove angle BA, the distal end 35$b$ of the stylus head 35$a$ is always in contact with the wall surface of the frame groove 50 regardless of the size of the angle TA formed by the frame groove 50 and the plane perpendicular to the Z-axis direction. Thus, only error correction when the distal end 35$b$ of the stylus head 35$a$ is in contact with the wall surface of the frame groove 50 need be considered. First, an angle β formed by two line segments La and Lb, which are formed when the plane (the plane including the X-axis and Y-axis in FIG. 12) including the distal end 35$b$ of the stylus head 35$a$ intersects the frame groove 50, is obtained from the frame groove angle BA and angle TA. The distance Hn between the distal end 35$b$ of the stylus head 35$a$ and the bottom 170 of the frame groove 50 is obtained from the angle β and the radius SR of the distal end 35$b$ of the stylus head 35$a$. More specifically, first, as shown in FIGS. 14A and 14B, a distance SDW between contact points 173 and 174, through which a circle with the radius SR at the distal end 35$b$ of the stylus head 35$a$ is simultaneously in contact with both the two line segments La and Lb intersecting at the angle β, is obtained. A distance BDW between the upper edge 50$b$ and lower edge 50$c$ of the frame groove 50 is obtained. If the two line segments La and Lb are not in contact with the circle of the distal end 35$b$ of the stylus head 35$a$, the line segments La and Lb are translated to come into contact with this circle, and then the distance SDW is obtained. When BDW≧SDW as shown in FIG. 14A, the distal end 35$b$ of the stylus head 35$a$ is in contact with the wall surface of the frame groove 50 through the contact points 173 and 174. Thus, a height VSa is obtained from SDW and SR. A height TSa is obtained from SDW and β, and the distance Hn is obtained on the basis of the following equation:

$$Hn=TSa-VSa$$

When BDW<SDW as shown in FIG. 14B, the distal end 35$b$ of the stylus head 35$a$ is in contact with the upper edges 50$b$ and 50$c$ of the frame groove 50. Thus, a height VSb is obtained from BDW and SR. Also, a height TSb is obtained from BDW and β, and the distance Hn is obtained on the basis of the following equation:

$$Hn=TSb-VSb$$

The distance Hn obtained in this manner is calculated throughout the entire circumference of the lens frame 4A (4B), and its value serves as the correction amount Hn (n=1, 2, 3, ..., N).

When the angle SA of the distal end 35$b$ of the stylus head 35$a$ is larger than the frame groove angle BA, depending on the size of the angle TA formed by the frame groove 50 and the plane perpendicular to the Z-axis direction, the upper end 35$d$ and lower end 35$e$ of the stylus head 35$a$ are undesirably in contact with the wall surface of the frame groove 50, and the distal end 35$b$ of the stylus head 35$a$ is not always in contact with the wall surface of the frame groove 50. Hence, the correction amount Hn (n=1, 2, 3, ..., N) is obtained considering a state in which the upper end 35$d$ and lower end 35$e$ of the stylus head 35$a$ are in contact with the wall surface of the frame groove 50. More specifically, first, it is examined at what position, from the distal end 35b to between the upper end 35d and lower end 35e, the stylus head 35a is in contact with the wall surface of the frame groove 50. Since the shape of the stylus head 35a is vertically symmetric with respect to the distal end 35b, only a portion from the distal end 35b to the upper end 35d of the stylus head 35a will be considered hereinafter.

Figure 15A:
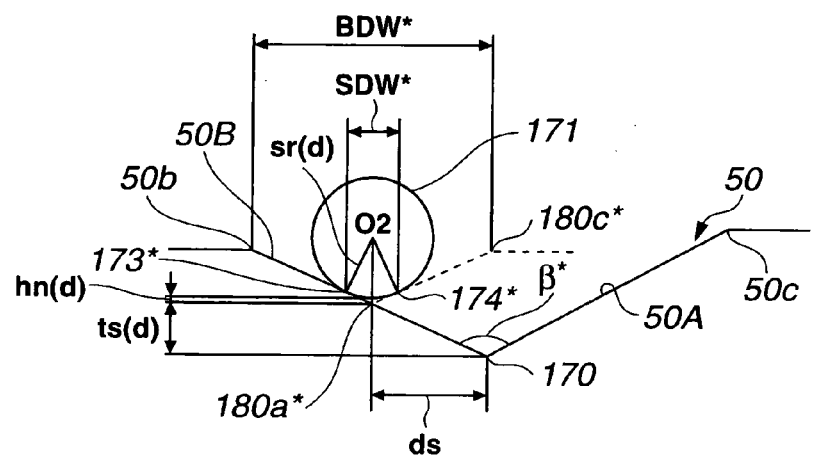
FIG. 15A is a plan view extending through a circle shown in FIG. 12.
Figure 15B:
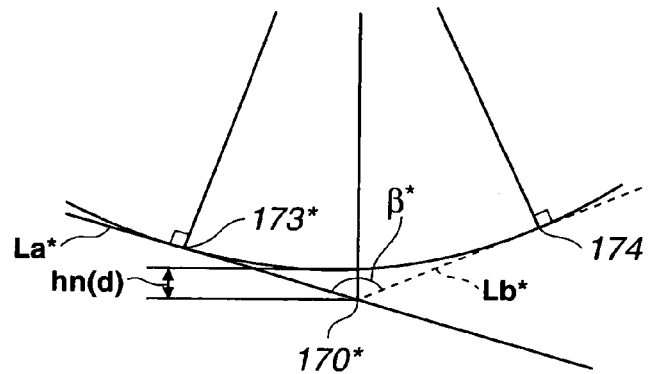
FIG. 15B is an enlarged view of the main part of FIG. 15A.

As shown in FIG. 12, assume that the center of the circle of the distal end 35b of the stylus head 35a is defined as O1, and that a circle 171 on the side surface of the stylus head 35a which has as the center a point O2 spaced apart from the center O1 by a distance d in the Z-axis direction is in contact with the wall surface of the frame groove 50. FIG. 15A shows a plane (a plane parallel to the X-Y plane in FIG. 12) passing through the circle 171. In FIGS. 15A and 15B, first, a horizontal distance ds from the bottom 170 of the frame groove 50 to the center O2 of the circle 171 is obtained. Assume that the direction of the bisector of an angle β* formed by two side walls 50A and 50B (FIG. 11) is defined as the vertical direction, and that a direction perpendicular to this bisector is defined as the horizontal direction. From the angle TA and distance d, ds is obtained on the basis of the following equation:

$$ds = d/\tan TA$$

Assuming that the intersection point of one tilt wall 50B of the frame groove 50 and a vertical line extending through the center O2 of the circle 171 is defined as 180a*, a vertical distance ts(d) from the bottom 170 of the frame groove 50 to the point 180a* is obtained from the distance ds and angle β*. The distance ts(d) is a function having d as a parameter. If the point 180a* is on the bottom 170 of the frame groove 50 in FIGS. 13A to 13C and FIG. 14A, a distance hn(d) between the lower end of the circle 171 and the point 180a* can be calculated by the same method as that of the method of calculating the distance Hn described with reference to FIGS. 13A to 13C and FIG. 14A. The distance hn(d) to be calculated is a function having d as a parameter. Portions in FIGS. 15A and 15B which are each denoted with a symbol (*) indicate corresponding portions in FIGS. 13A to 13C and FIG. 14A under this assumption. A vertical distance TO(d) from the center O2 of the circle 171 to the bottom 170 of the frame groove 50 is calculated on the basis of the following equation:

$$TO(d) = sr(d) + hn(d) + ts(d)$$

where sr(d) is the radius of the circle 171 having d as a parameter. TO(d) is a function having d as a parameter. Assuming that the circle 171 changes from the distal end 35b (d=0) of the stylus head 35a to the upper end 35d (d=SW/2) of the stylus head 35a, a value d0 of the distance d with which the distance TO(d) becomes a maximum value is obtained. That circle on the side surface of the stylus head 35a has a position at the distance of the value d0 as the center is the circle which is in actual contact with the wall surface of the frame groove 50. The distance Hn at this time is calculated on the basis of the following equation (1):

$$Hn = TO(d0) - SR \tag{1}$$

The above case described with reference to FIGS. 15A and 15B occurs only rarely and can accordingly be omitted when improving the calculation processing speed.

Figure 16:
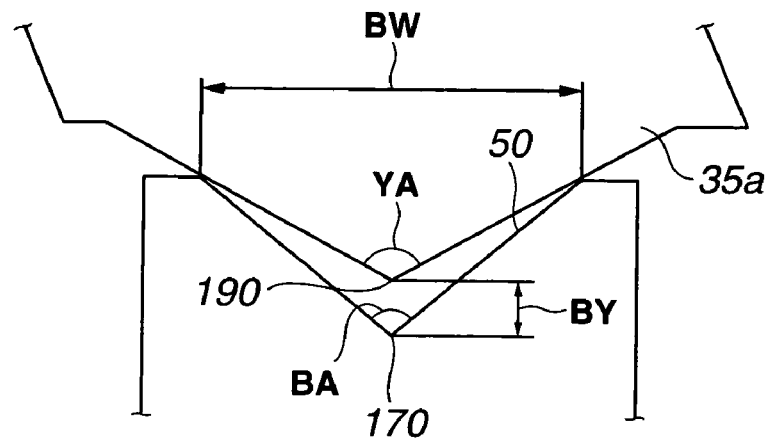
FIG. 16 is a Z-X plan view of the lens frame and a lens bevel.

The shape necessary for beveling is the shape of the locus of the distal end of the bevel in a state in which a beveled lens fits in a measured lens frame. This shape will be called a bevel distal end locus shape. As shown in FIG. 16, if the frame groove angle BA, the frame groove width BW, and a bevel vertical angle YA are determined, a position 190 of the bevel distal end locus shape is at a constant distance from the bottom 170 of the frame groove 50. This distance will be called a bevel groove distance BY. In order to obtain the bevel distal end locus shape as the final lens frame shape, an amount obtained by subtracting the bevel groove distance BY from the obtained correction amount Hn (n=1, 2, 3, . . . , N) is determined as the new correction amount Hn (n=1, 2, 3, . . . , N).

Figure 14C:
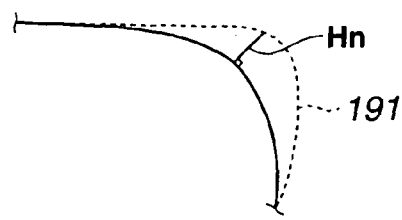
FIG. 14C shows a corrected shape and the correcting direction of a correction amount Hn.

As shown in FIG. 14C, the correction direction of the correction amount Hn is equal to the direction of normal to a shape obtained by projecting the frame groove shape coordinate points (Xn, Yn, Zn) onto the X-Y plane. Hence, a correction shape 191 obtained by deforming the frame groove shape coordinate points (Xn, Yn, Zn) in the direction of this normal by the correction amount Hn is determined as the new lens frame shape coordinate points (Xn, Yn, Zn) (n=1, 2, 3, . . . , N).

In this embodiment, the outer surface of the stylus head 35a forms a V-shaped convex disc. If the shape of the stylus head 35a is rotationally symmetric with respect to the Z-axis direction and the sectional shape including the rotational symmetry axis is known in advance, the contact state of the stylus head 35a with the tilted frame groove 50 can be grasped by calculation, and accordingly the bevel distal end locus shape can be corrected in the same manner as that described above. (Step S7-4)

In general, when the spectacle frame 4 is held by the spectacle frame shape measurement device 13 and the shapes of the lens frames 4A and 4B are to be measured, the front directions of the left and right lens frames 4A and 4B are tilted with respect to the Z-axis direction of the spectacle frame shape measurement device 13. The vectors in the front direction of the left and right lens frames 4A and 4B are determined in order to grasp the respective tilts.

According to the present invention, it is defined that the front directions of the lens frames 4A and 4B are the directions with which an area surrounded by a two-dimensional shape obtained by projecting the spectacle frame 4 onto a plane perpendicular to the front direction becomes maximum. The front directions of the lens frames 4A and 4B are grasped under this definition. Regarding the method of defining the front directions of the lens frames 4A and 4B, various types of methods are available in practice.

Figure 17:
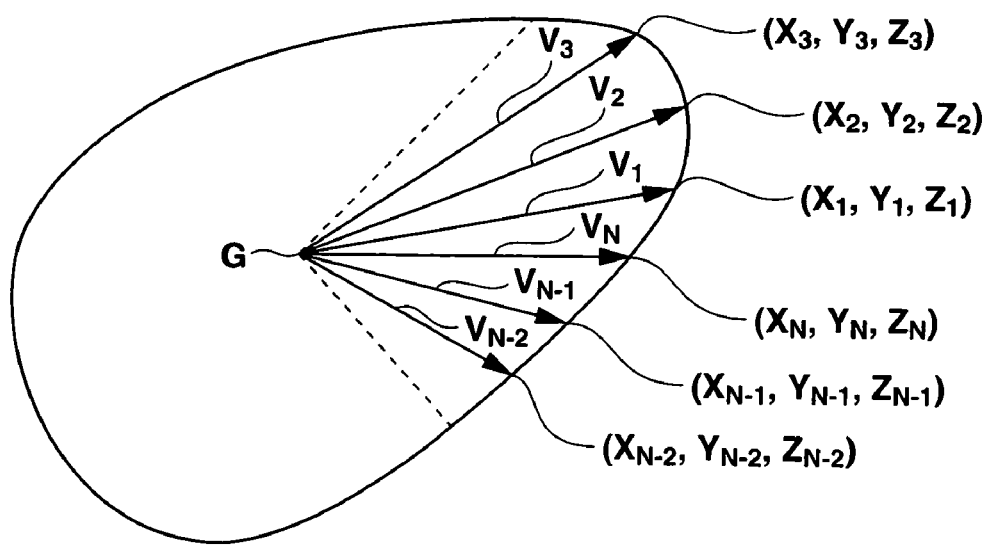
FIG. 17 is a perspective view showing vectors extending from a point located at almost the center of lens frame shape coordinate values as the start points and terminating at the respective coordinate values of the lens frame shape as the end points.

FIG. 17 shows an example of a strict definition method among the available methods. FIG. 17 shows vectors Vn (n=1, 2, 3, . . . , N) each having a point G (for example, a barycentric position given as the weighted mean of the X, Y, and Z components of the lens frame shape coordinate values) located at almost the center of the lens frame shape coordinate points as a start point, and a corresponding coordinate point (Xn, Yn, Zn) (n=1, 2, 3, . . . , N) of the lens frame shape as an end point. A unit vector FV of the front direction of the lens frame can be obtained from the following equation (2) by employing the vectors Vn (n=1, 2, 3, . . . , N):

$$FV = \Sigma(Vi \times Vi+1)/\|(Vi \times Vi+1)\| \quad (i=1 \text{ to } N) \tag{2}$$

Note that "x" represents the outer product of the vectors, and that when i=N, i+1=1.

Figure 18:
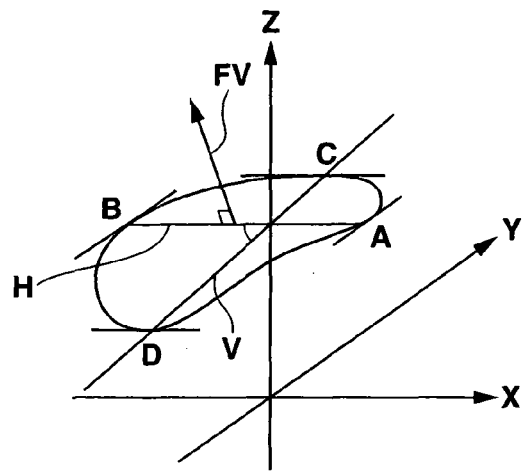
FIG. 18 is a perspective view showing the front direction of the lens frame.

The front directions of the lens frames 4A and 4B can be obtained approximately as well. This embodiment employs the approximate method which will be described with reference to FIG. 18. First, among lens frame shape coordinate points (Xn, Yn, Zn) (n=1, 2, 3, . . . , N) corrected in step S7-3, a point on the lens frame shape where Xn becomes a maximum value is determined as A, a point on the lens frame shape where Xn becomes a minimum value is determined as B, a point on the lens frame shape where Yn becomes a maximum value is determined as C, and a point on the lens frame shape where Yn becomes a minimum value is determined as D.

A vector extending from the point A to the point B is determined as H, and a vector extending from the point C to the point D is determined as V. At this time, the unit vector FV of the front direction of the lens frame is defined as a vector perpendicular to the two vectors H and V, and this vector FV is calculated.
(Step S7-5)

It is determined whether or not the process of steps S7-2 to S7-4 is performed for the shape measurement data of the left and right lens frames. If YES, the process advances to step S7-6. If NO, the process returns to step S7-2, and the remaining lens frame shape measurement data is processed.
(Step S7-6)

Figure 19:
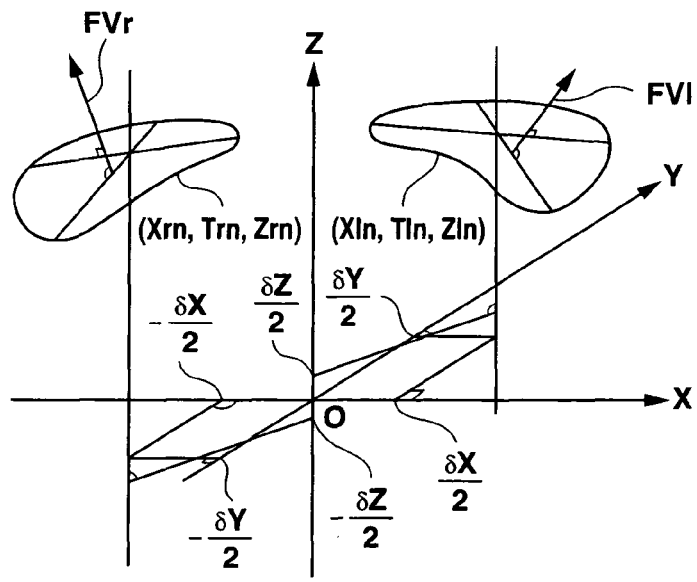
FIG. 19 is a perspective view of left and right lens frames arranged on one three-dimensional orthogonal coordinate system.

The coordinate points $(Xn, Yn, Zn)$ $(n=1, 2, 3, \ldots, N)$ of the left and right lens frame shapes obtained so far by the spectacle frame shape measurement device 13 have different coordinate origins, and accordingly they are respectively transformed into coordinate points on the same coordinate system having the same point as the origin, using the relative position data $(\delta X, \delta Y, \delta X)$ described above. This will be described with reference to FIG. 19.

First, the coordinate points $(Xn, Yn, Zn)$ $(n=1, 2, 3, \ldots, N)$ of the right lens frame shape are translated in the X-, Y-, and Z-axis directions respectively by $-\delta X/2$, $-\delta Y/2$, and $-\delta Z/2$, and the resultant coordinate values are calculated and determined as the coordinate points $(Xrn, Yrn, Zrn)$ $(n=1, 2, 3, \ldots, N)$ of the right lens frame shape. The front direction unit vector at this time is determined as FVr.

Subsequently, the coordinate points $(Xn, Yn, Zn)$ $(n=1, 2, 3, \ldots, N)$ of the left lens frame shape are translated in the X-, Y-, and Z-axis directions respectively by $\delta X/2$, $\delta Y/2$, and $\delta Z/2$, and the resultant coordinate values are calculated and determined as the coordinate points $(Xln, Yln, Zln)$ $(n=1, 2, 3, \ldots, N)$ of the left lens frame shape. The front direction unit vector at this time is determined as FVl.
(Step S7-7)

Figure 20:
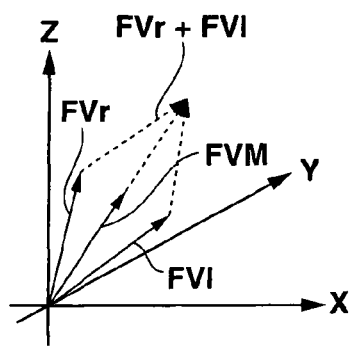
FIG. 20 is a perspective view showing the front direction unit vectors of the left and right lens frames and the front direction unit vector of the spectacles.

The front direction of the spectacles is calculated from the front direction unit vectors FVr and FVl of the right and left lens frames obtained in step S7-6, and the coordinate points $(Xrn, Yrn, Zrn)$ and $(Xln, Yln, Zln)$ of the right and left lens frame shapes and the front direction unit vectors FVr and FVl of the right and left lens frames are rotated such that the front direction of the spectacles coincides with the Z-axis direction. This will be described with reference to FIG. 20.

According to this embodiment, it is assumed that when the customer wears the spectacles, the left and right lens frames have the same tilt with respect to the plane (a plane perpendicular to the front direction of the spectacles) of the spectacles, and under this assumption the front direction of the spectacles is defined as the direction of the sum vector of the front direction unit vectors FVr and FVl of the right and left lens frames. More specifically, the unit vector of this sum vector is determined as a front direction unit vector FVM of the spectacles.

Subsequently, the coordinate points $(Xrn, Yrn, Zrn)$ $(n=1, 2, 3, \ldots, N)$ of the right lens frame shape and the coordinate points $(Xln, Yln, Zln)$ $(n=1, 2, 3, \ldots, N)$ of the left lens frame shape, and the front direction unit vectors FVr and FVl of the right and left lens frames are rotated about the origin as the center such that the front direction of the spectacles coincides with the Z-axis direction, thus calculating new transformation values.
(Step S7-8)

Figure 21:
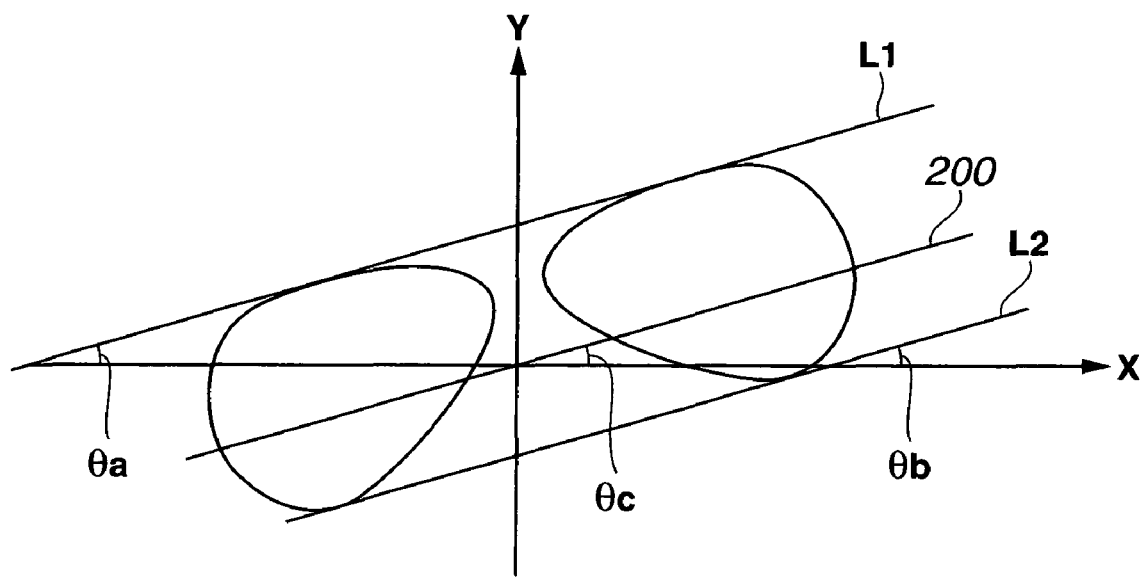
FIG. 21 is a plan view showing the left and right lens frames projected onto the X-Y plane.

An angle $\theta d$ formed by the X-axis direction and the datum line of the spectacles in the X-Y plane is obtained from the coordinate points $(Xrn, Yrn, Zrn)$ and $(Xln, Yln, Zln)$ of the right and left lens frame shapes transformed in step S7-7, and the coordinate points $(Xrn, Yrn, Zrn)$ and $(Xln, Yln, Zln)$ of the right and left lens frame shapes and the front direction unit vectors FVr and FVl of the right and left lens frames are transformed such that the datum line coincides with the X-axis direction. More specifically, using a two-dimensional shape obtained by projecting the left and right lens frames onto a plane perpendicular to the calculated front direction of the spectacles, the direction of the sum of a unit vector in the same direction as a tangent in contact with the upper portions of the left and right lens frames and a unit vector in the same direction as a tangent in contact with the lower portions of the left and right lens frames is calculated as the direction of the datum line of the spectacles. This will be described with reference to FIG. 21.

First, an angle $\theta a$ formed by the X-axis direction and an upper tangent L1 of the spectacles which is in contact with the left and right lens frame shapes simultaneously at the upper portion of the spectacles, and an angle $\theta b$ formed by the X-axis direction and a lower tangent L2 of the spectacles which is in contact with the left and right lens frame shapes simultaneously at the lower portion of the spectacles are obtained. An angle $\theta d$ formed by a datum line 200 of the spectacles and the X-axis direction is an intermediate angle of the angles $\theta a$ and $\theta b$. Thus, the average value of $\theta a$ and $\theta b$ is obtained, and the obtained average value is determined as the value of the angle $\theta d$.

Subsequently, the coordinate points $(Xrn, Yrn, Zrn)$ $(n=1, 2, 3, \ldots, N)$ of the right lens frame shape and the coordinate points $(Xln, Yln, Zln)$ $(n=1, 2, 3, \ldots, N)$ of the left lens frame shape which are transformed in step S7-7, and the front direction unit vectors FVr and FVl of the right and left lens frames are rotated through the angle $\theta d$ about the Z-axis as the rotation axis center such that the datum line 200 of the spectacles coincides with the X-axis direction, thus calculating new transformation values are calculated again.
(Step S7-9)

The distance between lens frames is calculated on the basis of the coordinate points $(Xrn, Yrn, Zrn)$ and $(Xln, Yln, Zln)$ of the right and left lens frame shapes transformed in step S7-8 again. This will be described with reference to FIG. 22.

Figure 22:
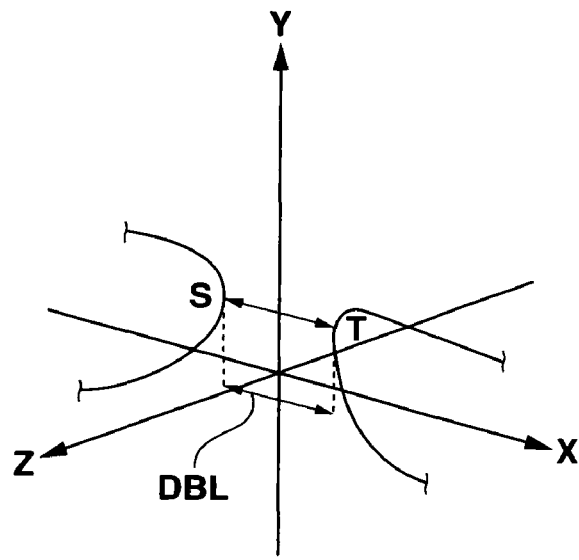
FIG. 22 is a perspective view of the left and right lens frames to indicate a distance between lens frames.

Referring to FIG. 22, a point S where Xrn becomes a maximum value among the coordinate points $(Xrn, Yrn, Zrn)$ of the right lens frame shape, and a point T where Xln becomes a minimum value among the coordinate points $(Xln, Yln, Zln)$ of the left lens frame shape are obtained, and a length DBL of a vector obtained by projecting a vector extending from the point S to the point T onto the Z-X plane is obtained. The length DBL is a bridge width. In this embodiment, the distance between lens frames is expressed using the bridge width DBL.
(Step S7-10)

On the basis of the coordinate points $(Xrn, Yrn, Zrn)$ and $(Xln, Yln, Zln)$ of the right and left lens frame shapes and the front direction unit vectors FVr and FVl of the right and left lens frames which are transformed in step S7-8 again, sizes A and B and the coordinates of the geometric center (frame center) of each of the left and right lens frames are calculated. The coordinate points $(Xrn, Yrn, Zrn)$ and $(Xln, Yln, Zln)$ of the right and left lens frame shapes are transformed, about the respective calculated geometric centers as the origins, into coordinate values with which the front direction unit vectors FVr and FVl of the right and left lens frames coincide with the Z-axis direction. This will be described with reference to FIG. 23. In the subsequent steps S7-10 to S7-16, the left and right lens frames need not be particularly distinguished. Accordingly, a description will be made by representing the lens frame shape coordinate values as (Xn, Yn, Zn) (n=1, 2, 3, ..., N) and the front direction unit vector of the lens frame as FV. This applies to both of the left and right lens frames.

Figure 23:
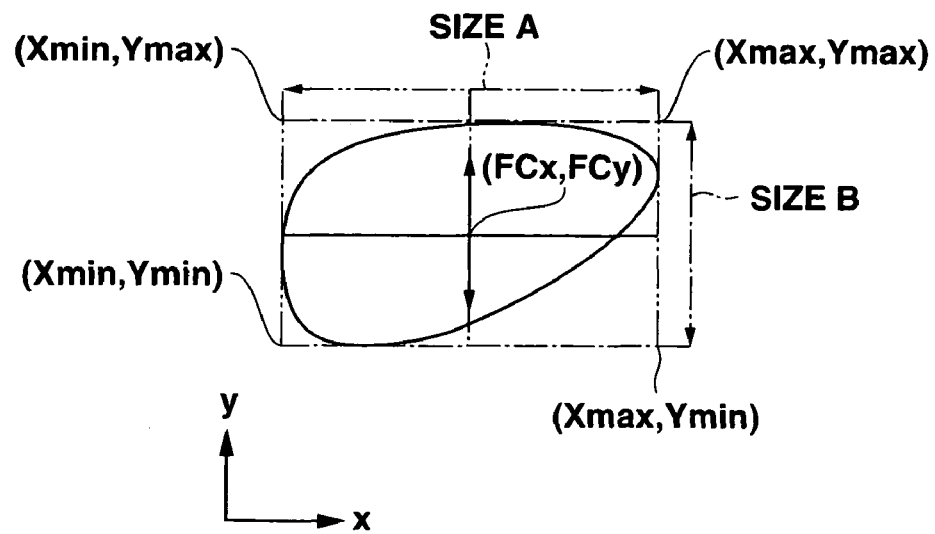
FIG. 23 is an X-Y plan view of the lens frame shape transformed such that the front directions of the lens frame coincides with the Z-axis direction.

Referring to FIG. 23, the lens frame shape coordinate points (Xn, Yn, Zn) (n=1, 2, 3, ..., N) are rotated about the origin as the center such that the front direction unit vector FV of the lens frame coincides with the Z-axis direction. Of the transformed coordinate points (Xn, Yn, Zn) obtained by this movement, assuming that the maximum value and minimum value of Xn are respectively determined as Xmax and Xmin and that the maximum value and minimum value of Yn are respectively determined as Ymax and Ymin, the size A of the lens frame shape can be obtained as the absolute value of the difference between Xmax and Xmin. The size B can be obtained as the absolute value of the difference between Ymax and Ymin.

The coordinates (FCx, FCy) of the geometric center (frame center) can be obtained in accordance with the following equations (3) and (4):

$$FCx=(Xmax+Xmin)/2 \quad (3)$$

$$FCy=(Ymax+Ymin)/2 \quad (4)$$

Then, the lens frame shape coordinate points (Xn, Yn, Zn) (n=1, 2, 3, ..., N) which are transformed in advance are transformed into coordinate values having the geometric center (FCx, FXy) as the origin, such that the front direction unit vector FV of the lens frame coincides with the Z-axis direction.

Also, the two-dimensional data (Xn, Yn) (n=1, 2, 3, ..., N) of the lens frame shape coordinate points (Xn, Yn, Zn) (n=1, 2, 3, ..., N) is transformed into polar coordinate points (Rn, θn) (n=1, 2, 3, ..., N) having the geometric center (FCx, FCy) as the origin.

Furthermore, of the polar coordinate points (Rn, θn), the maximum value of Rn is obtained and doubled to calculate an effective diameter ED.

(Step S7-11)

It is regarded that the lens frame shape coordinate points (Xn, Yn, Zn) (n=1, 2, 3, ..., N) having the geometric center obtained in step S7-10 as the origin are approximately located on a closed curve on a spherical surface or toric surface. The equation of this spherical surface or toric surface (such a curved surface will be called an approximate curved surface in this specification) is obtained. A case will be described with reference to FIG. 24 in which the approximate curved surface is a toric surface.

In FIG. 24, the center coordinates of the toric surface are determined as (a, b, c). The rotational symmetry axis direction unit vector of the toric surface is determined as (p, q, r). The radius of a maximum circle obtained when cutting the toric surface by a plane including the center coordinates (a, b, c) of the toric surface and perpendicular to the rotational symmetry axis direction unit vector (p, q, r) is determined as a base radius RB. The radius of a circle obtained when cutting the toric surface by a plane including the center coordinates (a, b, c) of the toric surface and parallel to the rotational symmetry axis direction unit vector (p, q, r) is determined as a cross radius RC.

In order to define the toric surface on the three-dimensional coordinate system, the equation of the toric surface having the center coordinate (a, b, c), the base radius RB, the cross radius RC, and the rotational symmetry axis direction unit vector (p, q, r) as variables is solved by the method of least square approximation using the data of the lens frame shape coordinate points (Xn, Yn, Zn) (n=1, 2, 3, ..., N). Hence, the center coordinate (a, b, c), the base radius RB, the cross radius RC, and the rotational symmetry axis direction unit vector (p, q, r) are obtained.

The obtained variables will be generically called approximate curve definition data. Although the lens frame shape is approximated to a toric surface in the above description, it can be approximated to a spherical surface. When defining the spherical surface on the three-dimensional coordinate system, the equation of a spherical surface having the center coordinates (a, b, c) and the radius R of curvature as variables is solved by the method of least square approximation using the values of the spectacle frame shape coordinate points (Xn, Yn, Zn) (n=1, 2, 3, ..., N). When approximating the lens frame shape to a spherical shape, the approximate curve definition data includes the center coordinates (a, b, c) and the radius R of curvature. Alternatively, only the radius R of curvature may be simply employed as the approximate curve definition data.

(Step S7-12)

A pitch angle AGL of the lens frame is calculated using the front direction unit vector FV of the lens frame 4A obtained in step S7-8. This will be described with reference to FIGS. 25A and 25B.

As shown in FIG. 25A, the pitch angle AGL of the lens frame is calculated as an angle formed by the front direction unit vector FV of the lens frame and the Y-z plane.

The frame PD as the distance between the geometric centers is calculated on the basis of the pitch angle AGL, the bridge width DBL obtained in step S7-9, and the size A obtained in step S7-10. More specifically, as shown in FIG. 25B, the size A differs between the left and right lens frames. Thus, the frame PD (FPD) can be calculated by the following equation (5):

$$FPD=(Ar+Al)/2 \cdot \cos(AGL)+DBL \quad (5)$$

where Ar is the size A of the right lens frame and Al is the size A of the left lens frame.

Data calculated by the spectacle frame shape measurement device 13 in the above manner is transmitted to the ordering terminal 10. Data to be calculated and data to be transmitted differ depending on the spectacle frame shape measurement device 13 to be employed. In this embodiment, the two-dimensional spectacle frame shape data (polar coordinate values), the approximate curved surface definition data, the frame PD (or DBL), the pitch angle, and the like are transmitted.

(Step S7-13)

At the ordering terminal 10, the spectacle frame shape data sent from the spectacle frame shape measurement device 13 is corrected on the basis of the preset correction value. As described above, in this embodiment, the correction value is obtained as the change mount in the radial direction. If the correction value is merely added to Rn of the polar coordinate points (Rn, θn), the shape may undesirably change. Hence, correction is performed by deforming the data by the correction value in the direction of normal to each point, in the same manner as in offset calculation shown in step S7-2. More specifically, first, the polar coordinate points (Rn, θn) (n=1, 2, 3, ..., N) as the two-dimensional spectacle frame shape data are transformed into the orthogonal coordinate points (Xsn, Ysn) (n=1, 2, 3, ..., N) similarly having the geometric center as the origin.

Figure 26:
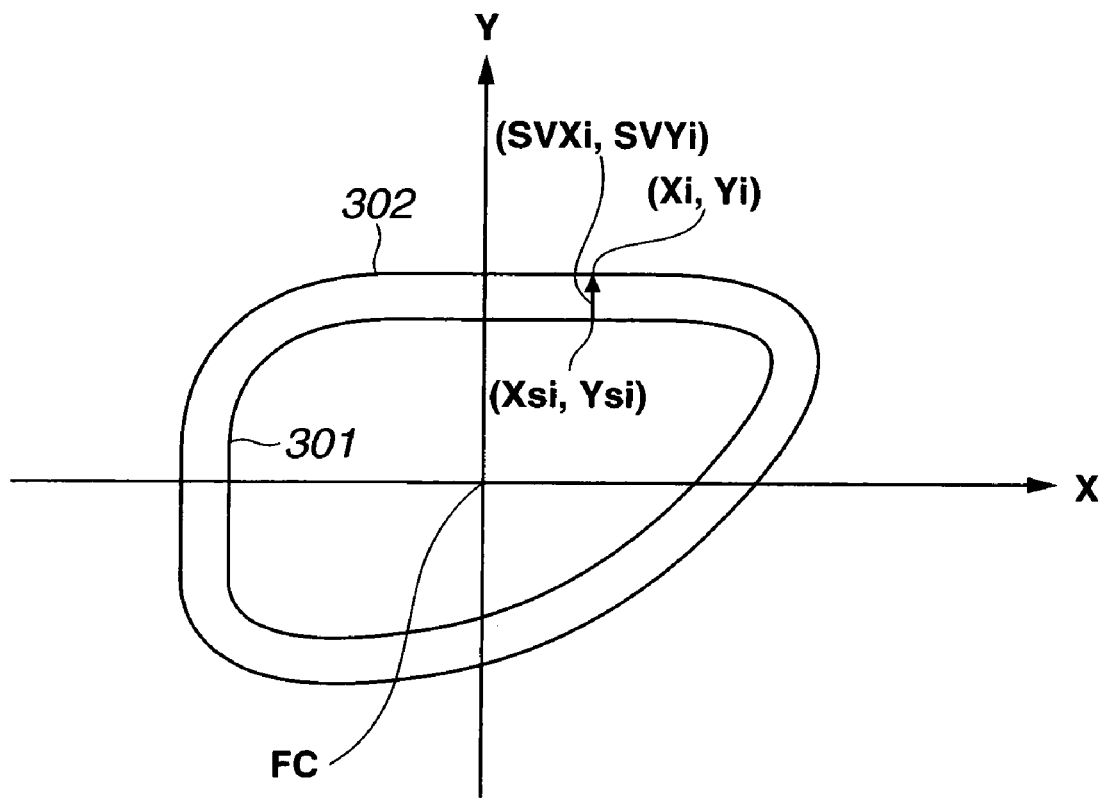
FIG. 26 is an X-Y plan view showing a lens frame shape transformed into orthogonal coordinate values and a lens frame shape corrected using a correction value.

In FIG. 26, when a normal vector which is a normal vector to the ith point (Xsi, Ysi) and has a size equal to the absolute value of the correction value is determined as (SVxi, SVyi), the orthogonal coordinate points (Xi, Yi) of the corrected lens frame shape can be obtained by adding the normal vector (SVxi, SVyi) to (Xsi, Ysi). When the correction value is a positive value, the normal vector is directed toward the outer side of the lens frame shape. When the correction value is a negative value, the normal vector is directed toward the inner side of the lens frame shape. This addition is performed from i=1 to i=N, thus calculating the corrected two-dimensional orthogonal coordinate points (Xn, Yn) (i=1, 2, 3, ..., N).
(Step S7-14)

On the approximate curved surface specified by the approximate curved surface definition data, the Z-axis coordinate value of the orthogonal coordinate points (Xn, Yn) (i=1, 2, 3, ..., N) obtained in step S7-13 is calculated as Zn. The three-dimensional spectacle frame shape coordinate points (Xn, Yn, Zn) (i=1, 2, 3, ..., N) are generated from the calculated Zn and the orthogonal coordinate points (Xn, Yn) obtained in step S7-13. The three-dimensional spectacle frame shape data obtained in this manner may be further subjected to conventional correction. A merge process to match the left and right lens frame shapes with each other for the purpose of balancing the left and right lens frames, as described in, e.g., Japanese Patent No. 3548569, may be performed.
(Step S7-15)

A circumference FLN of the lens frame shape (the perimetric shape of the bottom of the frame groove) is calculated from the lens frame shape coordinate points (Xn, Yn, Zn) (i=1, 2, 3, ..., N) obtained in step S7-14. The circumference FLN of the lens frame shape is calculated as the total sum of the distances among the respective points on the lens frame shape in accordance with the following equation (6):

$$FLN = \Sigma[((Xi-Xi+1)2+(Yi-Yi+1)2+(Zi-Zi+1)2)^{1/2}] \text{ (i=1 to } N\text{)} \quad (6)$$

Note that in the above equation (6), when i=N, i+1=1.
(Step S7-16)

As the result of correction in step S7-14, if the left and right lens frame shapes undesirably change from the shapes sent from the spectacle frame shape measurement device 13, preferably, the data that has changed due to this change in shape may be subjected to calculation again. According to this embodiment, the spectacle frame shape data to be sent to the factory 2 also needs to be transformed into two-dimensional spectacle frame shape data and approximate curved surface definition data. For this purpose, the process performed in steps S7-10 to S7-12 by the spectacle frame shape measurement device 13 is performed also by the ordering terminal 10 again. The principle of calculation is the same and a description thereof will thus be omitted. Data such as the two-dimensional shape data (polar coordinate values), the approximate curved surface definition data, the frame PD (or DLB), the pitch angle, and the like which are obtained by this step and necessary for lens machining are transmitted to the spectacle lens manufacture control device 20.

As has been described above, according to the present invention, the orderer measures the lens frame shapes of the spectacle frame 4, corrects a measurement error of the spectacle frame shape measurement device 13, and transmits the corrected measurement data to the factory 2, to request machining of the spectacle lens. The factory 2 need not correct the measurement error of the spectacle frame shape measurement device 13. This enables efficient spectacle lens machining.

In the embodiment described above, each of the shape data sent from the spectacle frame shape measurement device 13 to the ordering terminal 10 and the shape data sent from the ordering terminal 10 to the spectacle lens manufacture control device 20 comprises the two-dimensional spectacle frame shape data and approximate curved surface definition data. However, the shape data may comprise, e.g., three-dimensional spectacle frame shape coordinate values. In this case, a process for data format transformation can be omitted.

In the above embodiment, the correction value is generated on the basis of the difference between the reference circumference of the reference frame 30 and the measurement circumference obtained by measuring the reference frame 30. Alternatively, the correction value can be created on the basis of the ratio of the reference circumference to the measurement circumference. In this case, only the spectacle frame shape measured on the basis of this ratio need be enlarged or reduced, thus simplifying the process.

The invention claimed is:

1. A spectacle lens supply system including a spectacle frame shape measurement device which three-dimensionally measures a lens frame shape of a spectacle frame to generate three-dimensional spectacle frame shape information, an ordering terminal which generates order information based on the spectacle frame shape information generated by said spectacle frame shape measurement device and transmits the order information to a spectacle lens manufacturer, and a spectacle lens manufacture control device which generates machining information on the spectacle lens based on the order information transmitted from said ordering terminal,
   wherein said spectacle frame shape measurement device changes depending on an installation place,
   said ordering terminal comprises a measurement data correction unit which corrects a three-dimensional spectacle frame circumference using a correction value of a circumference of an inner peripheral surface of a lens of a spectacle frame corresponding to a machine type of said spectacle frame shape measurement device, the three-dimensional spectacle frame circumference being calculated from the spectacle frame shape information generated by said spectacle frame shape measurement device,
   said measurement data correction unit
   i) measures a right frame and a left frame of a reference frame having a predetermined reference circumference value by said spectacle frame shape measurement device to obtain three-dimensional shape measurement data then calculates a three-dimensional circumference value from the obtained measurement data,
   ii) calculates the three-dimensional circumference value a plurality of times to obtain a plurality of circumference values,
   iii) measures and calculates an average measurement circumference of the plurality of circumference values for each of the right frame and the left frame,
   iv) calculates an error between the calculated average measurement circumference and the predetermined reference circumference value for each of the right frame and the left frame,
   v) obtains an average value of the errors of right and left circumferences, and
   vi) outputs, as the correction value, a value obtained by dividing the obtained average value by $2\pi$, and
   the spectacle frame shape data serving as the order information transmitted from said ordering terminal to said spectacle lens manufacture control device includes a circumference of a spectacle frame corrected by said measurement data correction unit.

2. A system according to claim 1, wherein said measurement data correction unit has a correction value changing depending on the spectacle frame type information.

* * * * *